(12) United States Patent
Sand-Soll

(10) Patent No.: US 10,216,952 B2
(45) Date of Patent: *Feb. 26, 2019

(54) LOCATION BASED DISK DRIVE ACCESS

(71) Applicant: SEAGATE TECHNOLOGY LLC, Cupertino, CA (US)

(72) Inventor: Catherine Ellen Sand-Soll, Boulder, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/954,298

(22) Filed: Apr. 16, 2018

(65) Prior Publication Data
US 2018/0239923 A1 Aug. 23, 2018

Related U.S. Application Data

(63) Continuation of application No. 15/195,802, filed on Jun. 28, 2016, now Pat. No. 9,946,892, which is a continuation of application No. 14/465,402, filed on Aug. 21, 2014, now Pat. No. 9,378,383.

(51) Int. Cl.
G06F 21/62 (2013.01)
H04W 4/021 (2018.01)
G06F 21/31 (2013.01)
G06F 21/86 (2013.01)
G06F 17/30 (2006.01)
H04W 4/02 (2018.01)
(Continued)

(52) U.S. Cl.
CPC .... *G06F 21/6218* (2013.01); *G06F 17/30241* (2013.01); *G06F 17/30312* (2013.01); *G06F 21/31* (2013.01); *G06F 21/604* (2013.01); *G06F 21/86* (2013.01); *H04L 61/609* (2013.01); *H04W 4/02* (2013.01); *H04W 4/021* (2013.01); *G06F 2221/2111* (2013.01)

(58) Field of Classification Search
CPC ...... G06F 21/6218; G06F 21/31; G06F 21/86; G06F 17/30312; G06F 21/604; G06F 17/30241; G06F 2221/2111; H04W 4/021; H04W 4/02; H04L 61/609
See application file for complete search history.

(56) References Cited

U.S. PATENT DOCUMENTS

| 7,786,861 B2 * | 8/2010 | Howarth | G06F 21/88 340/5.31 |
| 8,560,648 B2 | 10/2013 | Sinha | |
| 8,561,142 B1 | 10/2013 | Sobel | |

(Continued)

*Primary Examiner* — Darren B Schwartz
(74) *Attorney, Agent, or Firm* — Holland & Hart LLP

(57) ABSTRACT

Methods, apparatuses, systems, and devices are described for providing data security. In one method, data security is provided for a computing device having a data storage drive. A predetermined geographical area within which access to the data storage drive of the computing device is permitted may be identified. A geographical location of the computing device also may be identified. When the identified geographical location of the computing device is outside of the identified geographical area, access to at least a portion of the data storage drive may be denied. When the identified geographical location of the computing device is within the identified geographical area, access to the portion (or all) of the data storage drive may be allowed.

18 Claims, 13 Drawing Sheets

(51) Int. Cl.
*G06F 21/60* (2013.01)
*H04L 29/12* (2006.01)

(56) References Cited

U.S. PATENT DOCUMENTS

| | | |
|---|---|---|
| 8,577,042 B2 | 11/2013 | Worthy |
| 8,725,109 B1 | 5/2014 | Baker et al. |
| 8,793,776 B1 | 7/2014 | Jackson |
| 8,856,916 B1 | 10/2014 | Sobel |
| 2002/0099955 A1 | 7/2002 | Peled et al. |
| 2004/0203840 A1 | 10/2004 | Jambhekar et al. |
| 2004/0205194 A1 | 10/2004 | Sahai |
| 2005/0055574 A1 | 3/2005 | Chmaytelli |
| 2005/0234735 A1 | 10/2005 | Williams |
| 2005/0272445 A1 | 12/2005 | Zellner |
| 2006/0009239 A1 | 1/2006 | Ogren |
| 2006/0059096 A1 | 3/2006 | Dublish et al. |
| 2006/0212664 A1 | 9/2006 | Takaragi |
| 2007/0236342 A1 | 10/2007 | Hines et al. |
| 2008/0004039 A1 | 1/2008 | Ober et al. |
| 2008/0022003 A1 | 1/2008 | Alve |
| 2008/0222705 A1 | 9/2008 | Goodmon et al. |
| 2008/0263363 A1 | 10/2008 | Jueneman et al. |
| 2009/0247122 A1 | 10/2009 | Fitzgerald et al. |
| 2010/0169949 A1 | 7/2010 | Rothman et al. |
| 2010/0273452 A1 | 10/2010 | Rajann et al. |
| 2010/0317336 A1 | 12/2010 | Ferren et al. |
| 2011/0131325 A1 | 6/2011 | Piccionelli et al. |
| 2011/0307724 A1 | 12/2011 | Shaw et al. |
| 2012/0117209 A1* | 5/2012 | Sinha .................... G06F 21/88 709/221 |
| 2012/0167180 A1* | 6/2012 | Lee .......................... G06F 21/31 726/4 |
| 2012/0198570 A1 | 8/2012 | Joa et al. |
| 2012/0317615 A1 | 12/2012 | Geva et al. |
| 2012/0331526 A1 | 12/2012 | Caudle et al. |
| 2012/0331527 A1* | 12/2012 | Walters ............... G06F 21/6218 726/4 |
| 2013/0246465 A1 | 9/2013 | Cambridge et al. |
| 2013/0305314 A1* | 11/2013 | Niimura ................ G06F 21/608 726/3 |
| 2013/0326607 A1 | 12/2013 | Feng |
| 2014/0013420 A1* | 1/2014 | Picionielli ............... G06F 21/88 726/17 |
| 2014/0188804 A1 | 7/2014 | Gokhale et al. |
| 2014/0250535 A1 | 9/2014 | Qu et al. |
| 2014/0289875 A1 | 9/2014 | Knafel |
| 2014/0331279 A1 | 11/2014 | Aissi et al. |
| 2014/0380424 A1* | 12/2014 | Thompson ............. G06F 21/31 726/4 |
| 2015/0026785 A1* | 1/2015 | Soon-Shiong ..... G06Q 30/0207 726/7 |
| 2015/0278539 A1 | 10/2015 | Scarasso |
| 2016/0026800 A1 | 1/2016 | Arenburg et al. |

\* cited by examiner

LOCATION BASED DISK DRIVE ACCESS

CROSS-REFERENCE TO RELATED APPLICATION

This application is a continuation of U.S. patent application Ser. No. 15/195,802, filed Jun. 28, 2016, and entitled LOCATION BASED DISK DRIVE ACCESS, now U.S. Pat. No. 9,946,892 issued on 17 Apr. 2018, which is a continuation of U.S. patent application Ser. No. 14/465,402, filed Aug. 21, 2014, now U.S. Pat. No. 9,378,383, issued on Jun. 28, 2016, and entitled LOCATION BASED DISK DRIVE ACCESS, the disclosures of which are incorporated herein in their entireties by this reference.

SUMMARY

The described features generally relate to one or more improved systems, methods, and/or apparatuses for providing data security for a computing device having a data storage drive. More particularly, the described features relate to techniques for restricting or even preventing access to data stored on the data storage drive based at least in part on a geographical location of the computing device. In one example, access to data on the data storage drive may be denied when the geographical location of the computing device is outside of a predetermined or prescribed geographical area.

For example, the predetermined/prescribe geographical area may be defined by a corporation's campus. In such case, an employee may have access to the data on the data storage drive of an assigned computing device, such as a laptop, when the computing device is located within the predetermined/prescribe geographical area, e.g., the property boundaries of the campus. If the employee leaves the campus with his laptop, access to the data on the data storage drive, or at least a portion of the data to be secured, may be denied. This may be the case even if the employee is still authorized and able to use his laptop, e.g., for email, Internet access, etc., outside of the predetermined/prescribe geographical area.

A method of providing data security is described. According to one implementation, the method may be implemented for a computing device having a data storage drive. The method may involve identifying a predetermined geographical area within which access to the data storage drive of the computing device is permitted. A geographical location of the computing device may be identified, and access to at least a portion of the data storage drive may be denied when the identified geographical location of the computing device is outside of the identified geographical area.

In some examples, the method may involve encrypting all data stored on at least the portion of the data storage drive.

In some examples, the method may involve determining that the identified geographical location of the computing device is outside of the identified geographical area for at least one of a predetermined period of time or for a predetermined number of geographical identifications. In such examples, denying access nay be based at least in part on the determining.

In some examples, the method may involve determining that the computing device is altered with respect to at least one of identifying the geographical area or identifying the geographical location. In such examples, the method may involve denying access to at least the portion of the data storage drive based at least in part on the determining.

In some examples, the method may involve removing from memory of the computing device data accessed from the data storage drive when the identified geographical location of the computing device is outside of the identified geographical area.

In some examples, the method may involve identifying when the computing device is moved. In such examples, the geographical location of the computing device may be re-identified when the computing device is identified as moved.

In some examples, the method may involve determining a failure of identifying the geographical location of the computing device. In such examples, the method may involve denying access to at least the portion of the data storage drive based at least in part on the determining.

In some examples, the method may involve determining that the identified geographical location of the computing device is within of the identified geographical area. In such examples, the method may involve determining that a geographic location of the computing device is not able to be identified during subsequent operation of the computing device. In such case, the method may involve determining an amount of movement of the computing device, and denying access to at least a portion of the data storage drive when the determined amount of movement exceeds a threshold value. In some examples, the threshold value may be set based at least in part on the identified geographical area.

In some examples, denying access may be performed by shutting down the data storage drive. Alternatively or additionally, denying access may be performed by disabling at least part of the data storage drive. Alternatively or additionally, denying access may be performed by destroying at least part of the data storage drive.

In some examples, the predetermined geographical area may be discontinuous. Alternatively or additionally, the predetermined geographical area may include a plurality of distinct geographical areas.

A computing device is described. According to one implementation, the computing device may include: a data storage drive; a location component configured to identify a geographical location of the computing device; and, a controller configured to deny access to at least a portion of the data storage drive when the geographical location of the computing device identified by the location component is outside of a predetermined geographical area within which access to the data storage drive of the computing device is permitted. The computing device may include these and/or other elements configured to carry out various operations of the methods described above and herein.

For example, the computing device may include a movement detector configured to indicate when the computing device is moved. In such case, the location component may be configured to re-identify the geographical location of the computing device based at least in part on an indication from the movement detector.

Also for example, the computing device may include a tamper detector configured to indicate when the location component is altered in an unauthorized manner. In such case, the controller may be configured to deny access to the portion of the data storage drive based at least in part on an indication from the tamper detector.

A system apparatus for providing data security for a computing device having a data storage drive is described. In one implementation, the system may include: a stored security policy for the computing device that identifies a predetermined geographical area within which access to the data storage drive of the computing device is permitted; a processor configured to identify a current geographical location of the computing device and to generate a signal to deny access to at least a portion of the data storage drive of the computing device when the current geographical location of the computing device is outside of the predetermined geographical area; and, a transmitter configured to send the signal to the computing device. The system may include these and/or other elements configured to carry out various operations of the methods described above and herein.

For example, the system may include a device identifier configured to identify the computing device. In such case, the processor may be configured to access the stored security policy for the computing device from a plurality of stored security policies based at least in part on an identity of the computing device from the device identifier.

Also for example, the system may include a location component configured to separately identify the geographical location of the computing device.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
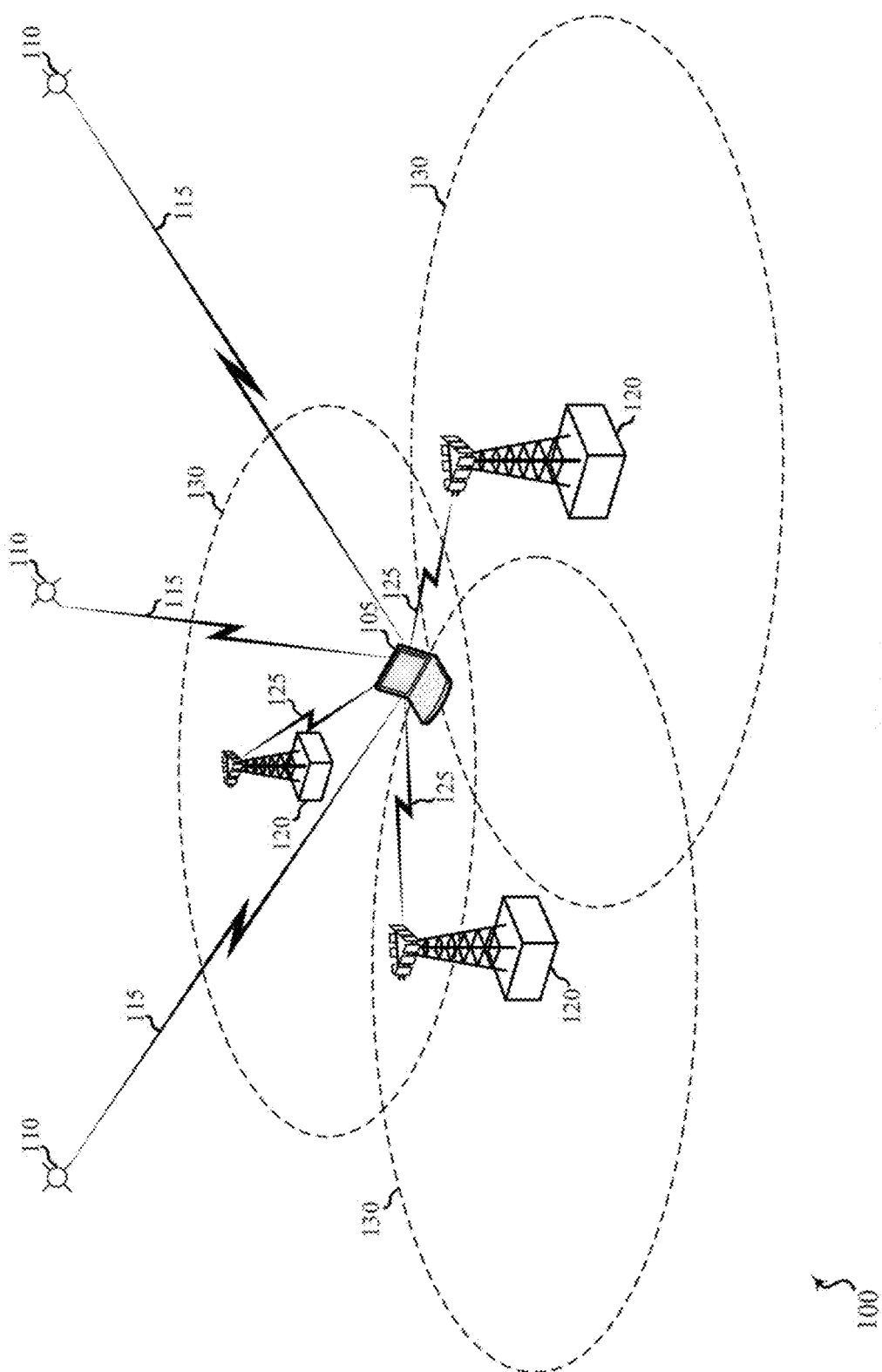
FIG. 1 is a block diagram of a communication system for a computing device, in accordance with various embodiments.

The following relates generally to providing security for data, and more specifically to providing data security for a computing device having a data storage drive.

Data security is an important issue, whether the data is the personal information of an individual, the business secrets of a corporation, or the governmental secrets of a nation. Various ways of storing and accessing data exist, as well as ways of securing data according to the manner in which the data may be accessed. For example, data for an enterprise may be stored on a central server and accessed by remote stations associated with the enterprise. The data central server may be accessed via a secure network, wired or wireless, and/or may require authentication before access to the data on the central server is granted. For example, an authorized user may have a user name and a password to provide authentication. Alternatively or additionally, the remote stations themselves may be authenticated in a suitable manner before access to the data on the central server is granted.

Alternatively or additionally, user access to the remote stations may also require authentication of the user, such as with a user name and password. This approach may be particularly beneficial when the remote stations are computing devices (e.g., a desktop computer, a laptop, etc.) that have processors and storage devices separate from the central server. In such case, access to data stored on the local storage device of a remote station may be secured as well.

Moreover, various devices not associated with a particular enterprise or central server may have data that is to be secured. Personal computers, laptops, tablets and smartphones may be secured against unauthorized use and/or access to data stored thereon. The need for such security may increase with the portability of such devices, with which the likelihood of theft, loss and/or unauthorized use/access may increase.

Therefore, providing data security for a computing device is described. According to one implementation, the computing device may have a data storage drive on which data to be secure may be stored. Security for such data may be provided by denying access to at least a portion of the data stored on the data storage drive. According to one implementation, access to all of the data stored on the data storage drive may be denied. For example, the data storage drive may be temporarily disabled or shut down.

The security for the data stored on the data storage drive of the computing device may be based, at least in part, on a geographical location of the device. For example, access to the data stored on the data storage drive may be authorized and permitted when the computing device is within a predetermined geographical area or areas. Access to the data stored on the data storage drive may be denied when the location of the computing device is outside the predetermined geographical area(s).

Providing data security based on the geographic location of the computing device may be implemented for portable computing devices, for example. Portable computing devices may have sensitive, private or secret information stored on a data storage drive thereof. Because portable computing devices are readily and often moved from place to place, the likelihood of access to such devices by unauthorized individuals may be significantly increased. Loss of the portable computing device, whether by inadvertence or theft, is more likely if the portable computing device is located in a less secure or unsecure location.

Still, relatively non-portable computing devices, such as desktop computers, servers, etc., may benefit from data security that is based on location. In such case, unauthorized removal of a non-portable computing device from its intended location (e.g., theft) may trigger denial of access to data stored on the data storage drive of the computing device. Such an approach also may facilitate off-site service or maintenance by protecting the data even when the removal is authorized.

Securing a computing device itself from unauthorized use may provide a layer of data security. However, there may be instances in which the computing device is "unlocked" when it is lost or stolen. Thus, securing access to the data storage drive of the computing device may be preferred or implemented in addition to securing access to the computing device itself. Further, securing access to the data storage drive of the computing device based on the location of the computing device may thwart a first individual, who otherwise may be authorized to access the data, from providing the secured data to a second unauthorized individual when the computing device is located outside a predetermined area(s) in which the first individual may normally have access. Thus, this approach may supplement security measures intended to keep unauthorized individuals out of the predetermined area(s) (e.g., corporate or government grounds).

Further, the computing device may have other uses (e.g., applications, such as email, web browser, etc.) that do not need access to the data storage drive (or at least the data that is to be secured). Such uses of the computing device may be enabled regardless of the location of the computing device. For example, in the case of a smartphone, the ability to send/receive emails and/or make/receive telephone calls may be desired outside of a geographical area in which access to the data stored on the data storage drive of the computing device is permitted.

The following description provides examples, and is not limiting of the scope, applicability, or configuration set forth in the claims. Changes may be made in the function and arrangement of elements discussed without departing from the scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram of a communication system 100 for a computing device 105 in accordance with various aspects of the present disclosure is shown. The communication system 100 may include global positioning system (GPS) components (e.g., satellites) with which the computing device 105 may communicate, via communication links 115, to determine a current location of the computing device 105.

The communication system 100 may also include a plurality of access points (e.g., cellular base stations and/or wireless local area network (WLAN) access points, etc., depending on the particular implementation) 120 with which the computing device 105 may communicate, via communication links 125, when the computing device 105 is located within a respective coverage area 130 of the access points 120. In some implementations, the computing device 105 or another device (not shown) may be configured to determine (e.g., triangulate) the current location of the computing device 105. Alternatively or additionally, the computing device 105 may be configured to communicate with another device (not shown) over a network with which the access points 120 are associated. Such a network may be in accordance with various radio access technologies (e.g., WiFi, LTE (Long Term Evolution), etc.), for example. Although wireless communication links 115, 125 are illustrated in FIG. 1, it should be understood that wired communication links are possible as well.

The computing device 105 may include a data storage drive (not separately shown) and may be, for example, a laptop computer, a notebook computer, a netbook computer, a tablet computer, a smartphone, or the like. Thus, according to some aspects, the computing device 105 may be portable or mobile.

In accordance with one implementation, the computing device 105 may be configured to identify a predetermined geographical area within which access to the data storage drive (e.g., data stored thereon) may be permitted. The computing device 105 may be provisioned or otherwise provided with the predetermined geographical area (e.g., in terms of coordinates). For example, the computing device 105 may securely store (e.g., administrator access only) the predetermined geographical area in a memory component (not separately shown). Thus, the computing device 105 may identify the predetermined geographical area by accessing the memory component. Alternatively or additionally, the computing device 105 may identify the predetermined geographical area by receiving the predetermined geographical area from another device (e.g., via wireless communication). In some implementations, geo-fencing techniques may be employed to define the predetermined geographical area.

The computing device 105 also may be configured to identify a geographical location of the computing device 105. The computing device 105 may include a GPS component (not separately shown) configured to determine location via GPS. Alternatively or additionally, the computing device 105 may include a triangulation component (not separately shown) configured to determine location via the access points 120. In some cases, the computing device 105 may be configured to determine location in multiple ways to provide redundancy and/or to provide verification of the location of the computing device 105.

Using the identified geographical location of the computing device 105 and the identified geographical area, the computing device 105 may determine whether the computing device 105 is outside the predetermined geographical area. Based on this determination, when the computing device 105 is located outside the predetermined geographical area, the computing device 105 may deny access to the data storage drive (or at least a potion thereof having data to be secured). When the computing device 105 is determined to be located within the predetermined geographical area, the computing device 105 may allow access to the data storage drive (e.g., secured data stored thereon).

In accordance with another implementation, a device (not shown) other than the computing device 105 may be configured to identify a predetermined geographical area within which access to the data storage drive may be permitted. For example, a security service provider (not shown), such as a location based service (LBS), may provide the device (e.g., a server) that identifies the predetermined geographical area associated with the computing device 105. The device may be configured to identify the predetermined geographical area by identifying the computing device 105. Thus, the device(s) of the security service provider may be configured to cooperate with multiple computing devices 105 each with corresponding predetermined geographical areas. The device(s) of the security service provider may securely store predetermined geographical areas associated with individual computing devices 105. Thus, the device(s) of the security service provider may identify the predetermined geographical area for a given computing device 105 by identifying the computing device 105 and determining the predetermined geographical area associated with the identified computing device 105. In some cases, the device(s) of the security service provider may provide (e.g., communicate) the identified/determined geographical area to the computing device 105, which may use the identified/determined geographical area as described above.

The device(s) of the security service provider also may be configured to identify a geographical location of the computing device 105 (e.g., by monitoring the location of the computing device 105). The device(s) of the security service provider may receive a current location of the computing device 105 (e.g., determined via GPS and/or triangulation) from the computing device 105, via a component of the GPS, or via the network associated with the access points 120. If the current location of the computing device 105 is determined in multiple ways, the device(s) of the security service provider compare the determinations to verify the current location.

Using the identified geographical location of the computing device 105 and the identified geographical area, the device(s) of the security service provider may determine whether the computing device 105 is outside the predetermined geographical area. Based on this determination, when the computing device 105 is located outside the predetermined geographical area, the device(s) of the security service provider may instruct (e.g., transmit a signal to cause) the computing device 105 to deny access to the data storage drive. When the computing device 105 is determined to be located within the predetermined geographical area, the device(s) of the security service provider may instruct the computing device 105 to allow access to the data storage drive, or may do nothing (e.g., not instruct the computing device 105 to deny access).

Figure 2:
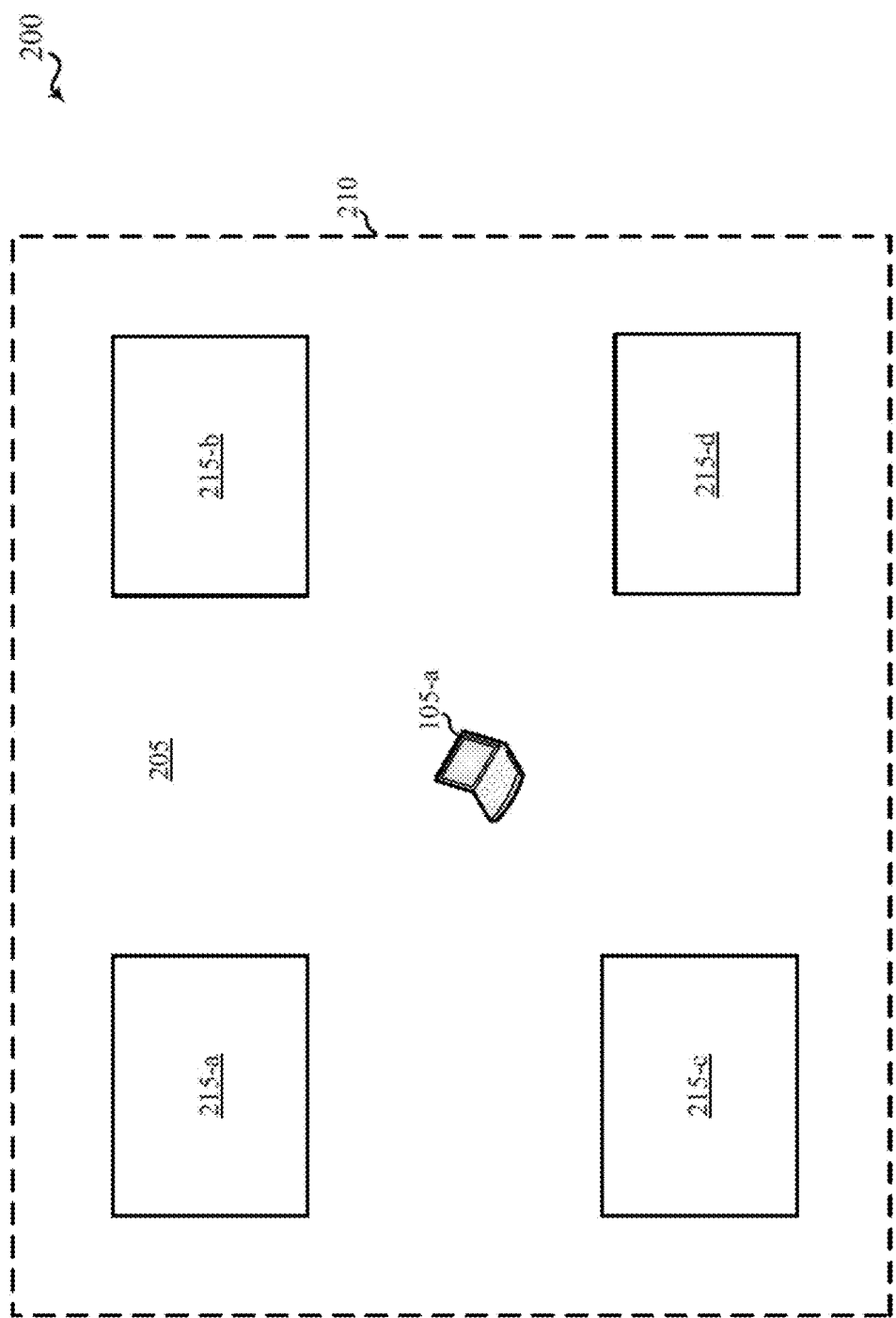
FIG. 2 is a block diagram that illustrates an example of a deployment scenario for a computing device, in accordance with various embodiments.

FIG. 2 shows a block diagram that illustrates an example of a deployment scenario 200 for a computing device 105-a, in accordance with various aspects of the present disclosure. In one implementation, the deployment scenario 200 represents a corporate campus or a governmental complex having a boundary 210 (e.g., a secure perimeter) within which various buildings 215-a, 215-b, 215-c and 215-d are located. According to the deployment scenario 200, the computing device 105-a may be configured to allow access to data stored on a data storage drive thereof when the computing device 105-a is located within a predetermined geographical area, for example, defined by the boundary 210. The computing device 105-a also may be configured to deny access to data stored on the data storage drive thereof when the computing device 105-a is located outside the predetermined geographical area defined by the boundary 210. This may be implemented, for example, as described above with respect to FIG. 1. Thus, it should be understood that the computing device 105-a may be an example of the computing device 105 in FIG. 1.

The area within the boundary 210 (defining or otherwise used to establish the predetermined geographical area) may be secured from entry by unauthorized individuals. Thus, an authorized individual associated with the computing device 105-a may operate the computing device 105-a with access to data stored on the data storage drive while located within the boundary 210. The individual (with the computing device 105-a) may move between the buildings 215-a, 215-b, 215-c and 215-d without affecting the access to the data storage drive.

In some implementations, the computing device 105-a (or a device of a security service provider) may periodically update the location of the computing device 105-a to ensure that the location is current. Alternatively or additionally, the computing device 105-a (or a device of a security service provider) may update the location of the computing device 105-a based on movement of the computing device 105-a. The computing device 105-a may include a component (not separately shown) configured to detect motion of the computing device 105-a. The component may be an accelerometer, for example. Alternatively or additionally, the component may be a range finder configured to "ping" the access point(s) 120 to allow determination of a change in the range between the computing device 105-a and the access point(s) 120 corresponding to movement of the computing device 105-a.

According to the deployment scenario 200, as the computing device 105-a is moved within the boundary 210, the updated location of the computing device 105-a may cause access to the data storage drive of the computing device 105-a to be allowed. However, upon movement of the computing device 105-a across the boundary 210 to be outside the predetermined geographical area, the updated location of the computing device 105-a may cause access to the data storage drive of the computing device 105-a to be denied. In some implementations, the updating of the current location of the computing device 105-a may be dynamically adjusted. For example, the frequency of updating may be adjusted based on the speed of movement of the computing device 105-a. Alternatively or additionally, frequency of updating may be adjusted based on how close to the boundary 210 the computing device 105-a is moved or located.

Figure 3:
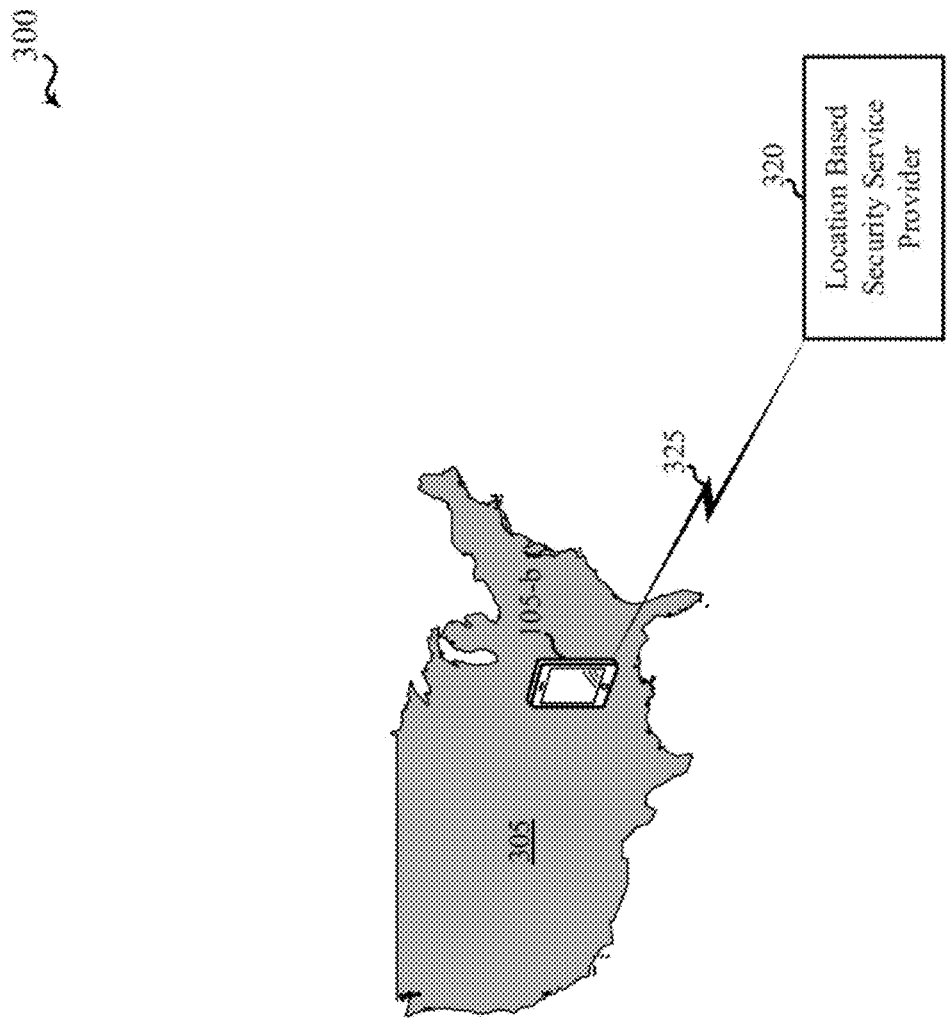
FIG. 3 is a block diagram that illustrates another example of a deployment scenario for a computing device, in accordance with various embodiments.
Figure 3:
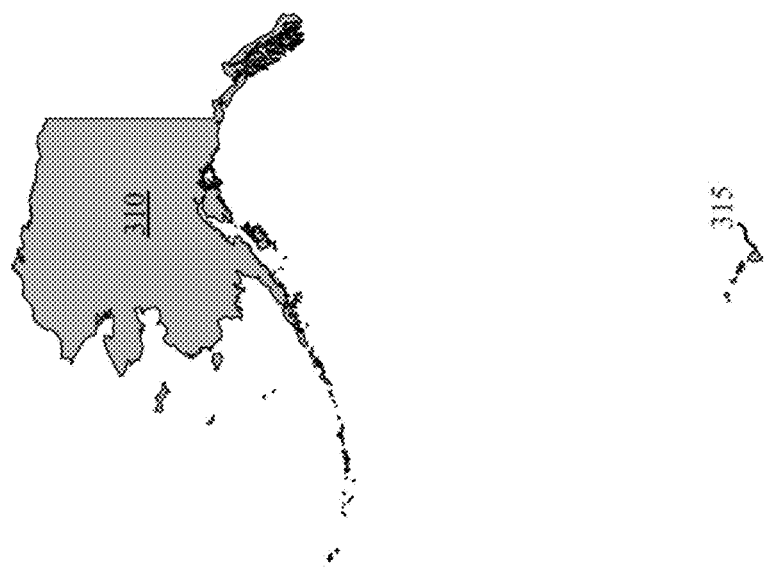

FIG. 3 shows a block diagram that illustrates an example of a deployment scenario 300 for a computing device 105-b, in accordance with various aspects of the present disclosure. The deployment scenario 300 represents a territorial or national-based predetermined geographical area. According to the deployment scenario 300, the computing device 105-a may be configured to allow access to data stored on a data storage drive thereof when the computing device 105-a is located within a predetermined geographical area, for example, defined by multiple areas 305, 310 and 315. As shown, distinct geographical areas of the contiguous states 305, Alaska 310 and Hawaii 315 define the predetermined geographical area as the United States.

Thus, the predetermined geographical area may be discontinuous. In other instances, the predetermined geographical area may include multiple adjacent and/or overlapping areas. In some implementations, the amount of data stored on the data storage drive of the computing device 105-b may vary based on the specific area within the predefined geographical area that the computing device 105-b is located. For example, different portions of the data storage drive of the computing device 105-b may store data according to different levels of security that is to be provided for the data. Alternatively, the data stored on the data storage drive may be encoded to identify an associated level of security. In such case, the predefined geographical area(s) or subsets thereof may correspond to different levels of security such that access to data stored on the data storage drive is limited to the level of security corresponding to the predefined geographical area(s) within which the computing device 105-b is currently located.

The deployment scenario 300 also includes a location based security service provider 320. The location based security service provider 320 may communicate with the computing device 105-b via a communication link 325. This may be implemented, for example, as described above with respect to FIG. 1. Thus, it should be understood that the computing device 105-b may be an example of the computing device 105 in FIG. 1. Further, the location based security service provider 320 may be configured to cooperate with the computing device 105-b as described above with respect to FIG. 2. Thus, it should be understood that the computing device 105-b may be an example of the computing device 105-a in FIG. 2.

It should be understood that the various features described above with respect to FIGS. 1, 2 and/or 3 may be combined to achieve other deployment scenarios as well. Thus, the deployment scenarios described above are intended to be illustrative and not exhaustive.

Figure 4A:
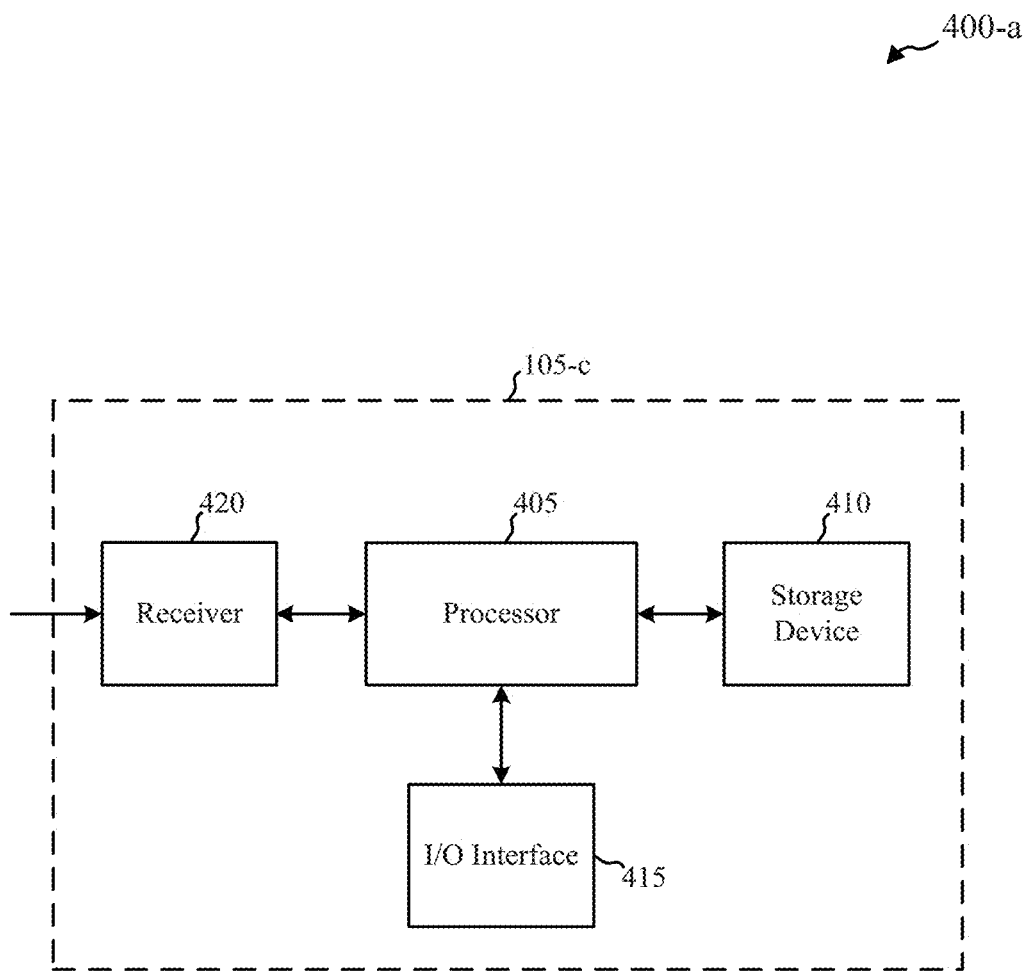
FIG. 4A is a block diagram of an example of a computing device for which data security may be provided, in accordance with various embodiments.

FIG. 4A shows a block diagram 400-a of a computing device 105-c for which data security may be provided, in accordance with various aspects of the present disclosure. In some implementations, the computing device 105-c may be an example of various aspects of the computing devices 105, 105-a and/or 105-b described with reference to FIGS. 1, 2 and/or 3. The computing device 105-c may include a processor 405, a storage device 410, an input/output (I/O) interface 415 and/or a receiver 420. Each of these components may be in communication with each other.

The components of the computing device 105-c may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some implementations, the processor 405 may be a central processing unit (CPU) of the computing device 105-c. The processor 405 may be configured to control or otherwise cooperate with the storage device 410, the I/O interface 415 and the receiver 420 to carry out various operations of the computing device 105-c in connection with the location-based data security features described herein. The processor 405 may also be configured to carry out other functions of the computing device 105-c by controlling these and/or other components that may be included in the computing device 105-c according to its design.

For example, the I/O interface 415 may be configured to receive user input and provide feedback to the user. The I/O interface 415 may be any suitable device, including but not limited to a touchscreen, a keyboard, a mouse, a display, a speaker, or the like. In this example, the processor 405 may receive input from the I/O interface 415 and may provide feedback to the user via the I/O interface 415. For example, the processor 405 may receive a user request for data stored on the storage device 410. When access to the storage device 410 and/or the specific data requested is allowed based on the current location of the computing device 105-c as described herein, the processor 405 may retrieve the data from the storage device 410 and provide the data to the user via the I/O interface 415.

The receiver 420 may be or include a radio frequency (RF) receiver, such as an RF receiver operable to receive transmissions according to one or more radio access technologies. Alternatively or additionally, the receiver 420 may be or include a GPS signal receiver, such as a receiver configured to receive signals from GPS satellites or other GPS components. In some instances, the computing device 105-c may include a transmitter (not shown), or the receiver 420 may be a transceiver, so as to facilitate communications with GPS, the access points 120, and/or the location based security service provider 320 as described above.

The storage device 410 may be a data storage drive, such as a hard disk drive. The storage device 410 may be partitioned or otherwise divided into different portions such that data stored on different portions of the storage device 410 may be provided with different levels of security. For example, the storage device 410 may be divided into a secure data portion and a non-secure data portion. In such case, data stored on the non-secure data portion of the storage device 410 may be accessible regardless of the location of the computing device 105-c. On the other hand, data stored on the secure data portion of the storage device 410 may be accessible or non-accessible based on whether the current location of the computing device 105-c is within the predefined geographical area(s).

Figure 4B:
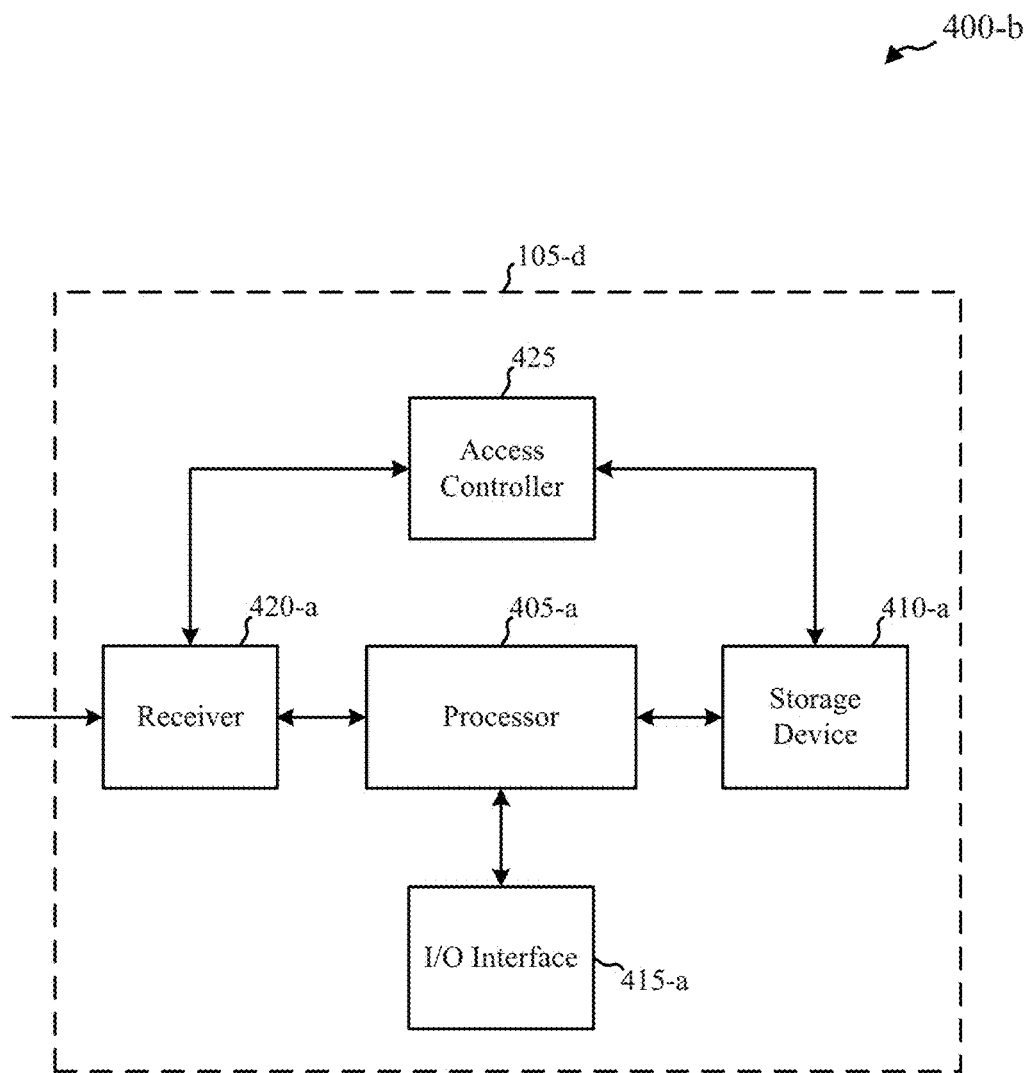
FIG. 4B is a block diagram of another example of a computing device for which data security may be provided, in accordance with various embodiments.

FIG. 4B shows a block diagram 400-b of a computing device 105-d for which data security may be provided, in accordance with various aspects of the present disclosure. In some implementations, the computing device 105-d may be an example of various aspects of the computing devices 105, 105-a, 105-b and/or 105-c described with reference to FIGS. 1, 2, 3 and/or 4A. The computing device 105-d may include a processor 405-a, a storage device 410-a, an input/output (I/O) interface 415-a, a receiver 420-a and/or an access controller 425. Each of these components may be in communication with each other.

The components of the computing device 105-d may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some implementations, the storage device 410-a, the I/O interface 415-a and the receiver 420-a may be configured similarly to the storage device 410, the I/O interface 415 and the receiver 420, respectively, as described above with reference to FIG. 4A.

In some implementations, the processor 405-a may be configured to perform similar operations as the processor 405 described above with reference to FIG. 4A. However, the access controller 425 may be configured to control or otherwise cooperate with the storage device 410-a and the receiver 420-a to carry out various operations of the computing device 105-d in connection with the location-based data security features described herein.

For example, the access controller 425 may be configured to identify the predetermined geographical area(s), to identify the current geographical location of the computing device 105-d, to determine whether the current geographical location is within the predetermined geographical area(s), and to allow and/or deny access to the storage device 410-a (or a portion thereof) based on the determination. In some instances, the access controller 425 may be part of the storage device 410-a.

In the example of FIG. 4B, the access controller 425 may be a processor. Because the access controller 425 is separate from the processor 405-a (e.g., CPU), the access controller 425 may be configured solely to implement the location-based data security features described herein. Further, the user of the computing device 105-d may be prevented from accessing the access controller 425 to modify, reconfigure or otherwise tamper with the data security functionality provided thereby. For example, when the computing device is provisioned or otherwise provided with the predefined geographical area(s), such information may be maintained by the access controller 425. As such, the user of the computing device 105-d may be prevented from tampering with the predefined geographical area(s).

The processor 405-a may be configured according to the desired functionality of the computing device 105-d without regard to data security implemented at the storage device level. In some instances, the storage device 410-a may be divided into a non-secure portion and a secure portion. In such case, the processor 405-a may have direct access to the non-secure portion of the storage device 410-a. However, if data is requested from the secure portion of the storage device 410-a (e.g., via the I/O interface 415-a or an application being run by the processor 405-a), the processor 405-a may cooperate with the receiver 420-a to obtain the current geographical location of the computing device 105-d for the access controller 425 to use to determine whether access to the secure portion of the storage device 410-a should be denied.

Figure 4C:
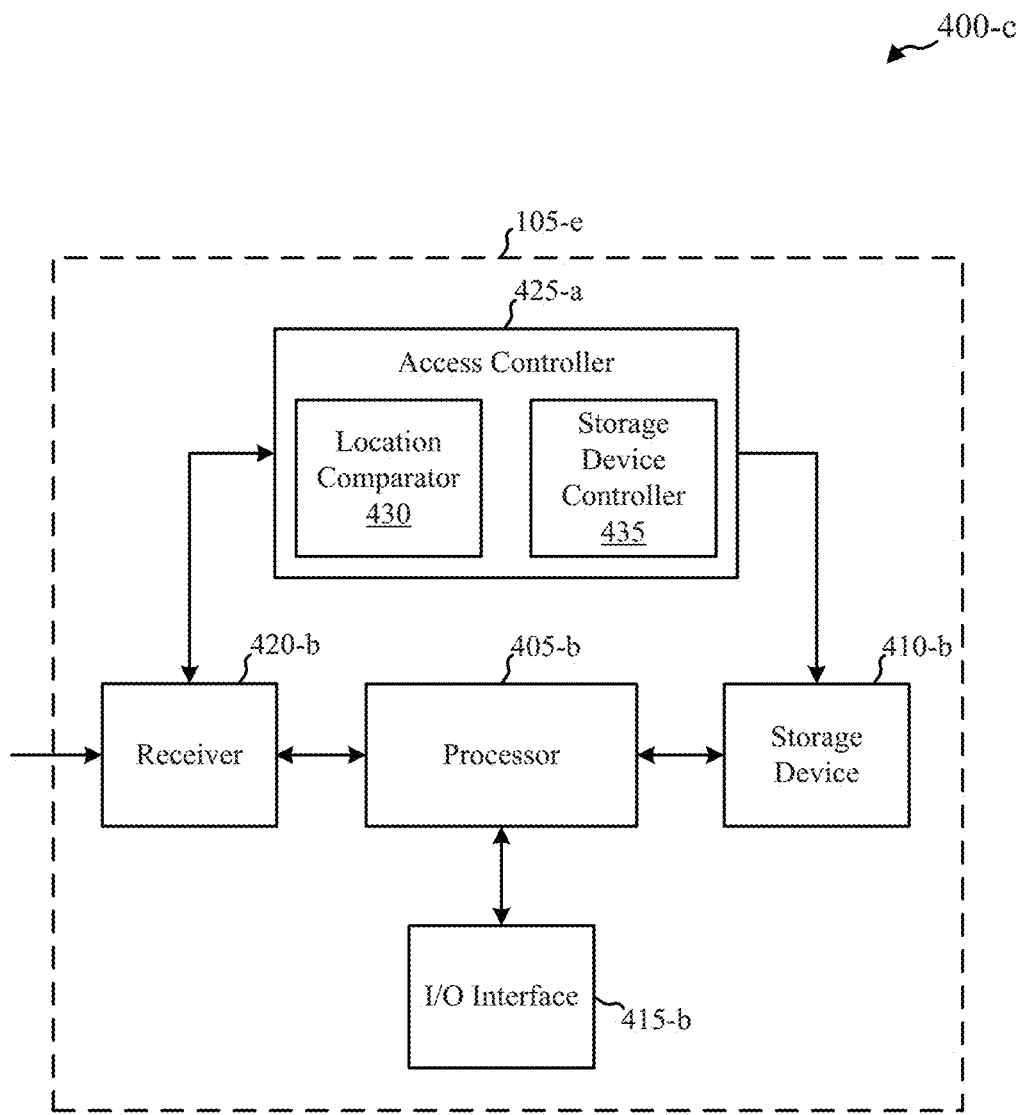
FIG. 4C is a block diagram of yet another example of a computing device for which data security may be provided, in accordance with various embodiments.

FIG. 4C shows a block diagram 400-c of a computing device 105-e for which data security may be provided, in accordance with various aspects of the present disclosure. In some implementations, the computing device 105-e may be an example of various aspects of the computing devices 105, 105-a, 105-b, 105-c and/or 105-d described with reference to FIGS. 1, 2, 3, 4A and/or 4B. The computing device 105-e may include a processor 405-b, a storage device 410-b, an input/output (I/O) interface 415-b, a receiver 420-b and/or an access controller 425-a. Each of these components may be in communication with each other.

The components of the computing device 105-e may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some implementations, the storage device 410-b, the I/O interface 415-b and the receiver 420-b may be configured similarly to the storage device 410, 410-a, the I/O interface 415, 415-a, and the receiver 420, 420-a, respectively, as described above with reference to FIGS. 4A and/or 4B.

In some implementations, the processor 405-b may be configured to perform similar operations as the processor 405, 405-a described above with reference to FIGS. 4A and/or 4B. Further, the access controller 425 may be configured to control or otherwise cooperate with the storage device 410-b and the receiver 420-b to carry out various operations of the computing device 105-e in connection with the location-based data security features described herein, such as described above with respect to FIG. 4B.

In this example, the access controller 425-a may include a location comparator 430 and a storage device controller 435. The location comparator 430 may be configured to compare the predetermined geographical area(s) and the current geographical location of the computing device 105-e (from the receiver 420-b) to determine whether the current geographical location is within the predetermined geographical area(s). The storage device controller 435 may be configured to allow and/or deny access to the storage device 410-b (or a portion thereof) using the determination from the location comparator 430. In some instances, the storage device controller 435 may be part of the storage device 410-b.

Figure 4D:
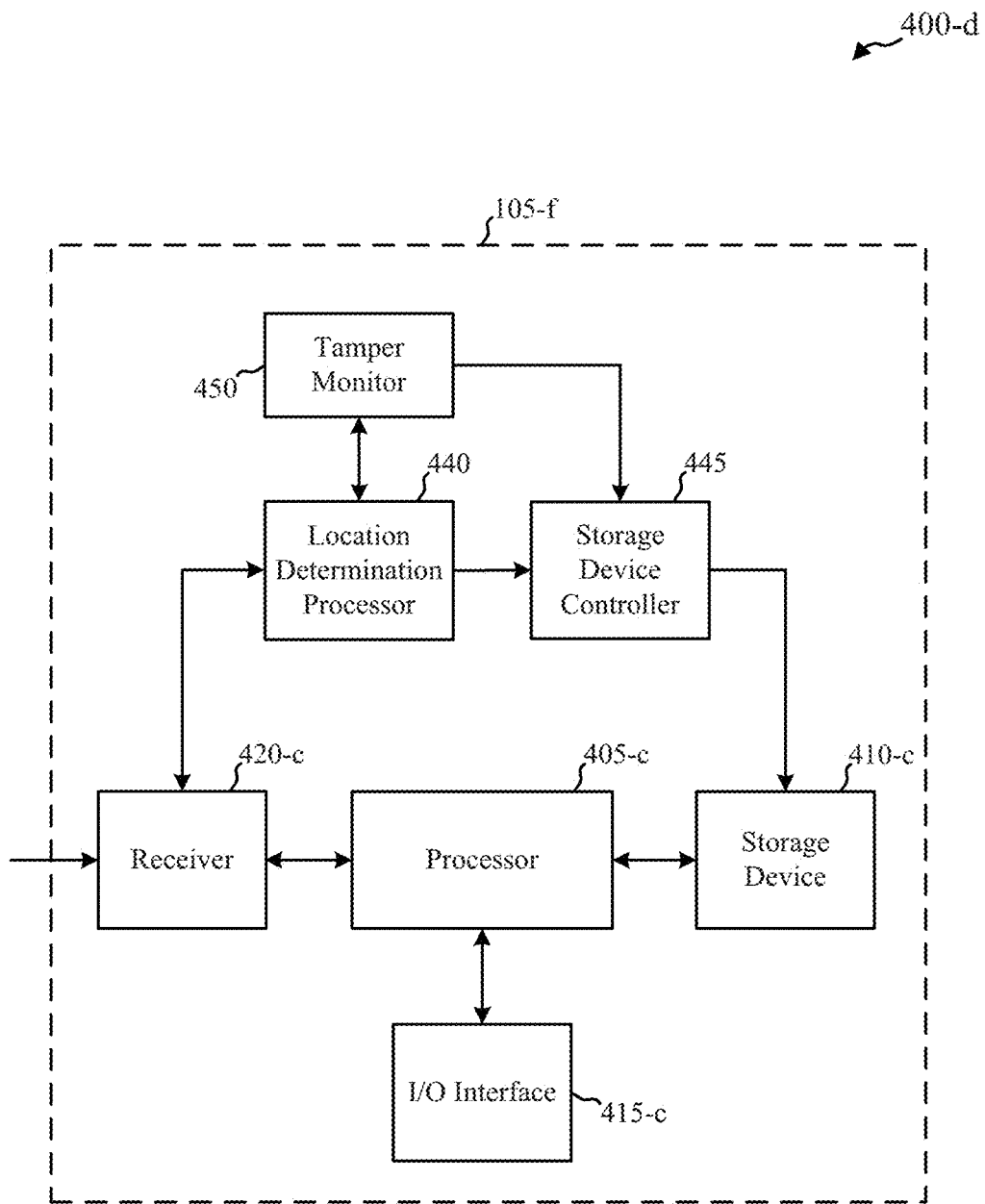
FIG. 4D is a block diagram of still another example of a computing device for which data security may be provided, in accordance with various embodiments.

FIG. 4D shows a block diagram 400-d of a computing device 105-f for which data security may be provided, in accordance with various aspects of the present disclosure. In some implementations, the computing device 105-f may be an example of various aspects of the computing devices 105, 105-a, 105-b, 105-c, 105-d and/or 105-e described with reference to FIGS. 1, 2, 3, 4A, 4B and/or 4C. The computing device 105-f may include a processor 405-c, a storage device 410-c, an input/output (I/O) interface 415-c and/or a receiver 420-c. Each of these components may be in communication with each other. The computing device 105-f further may include a location determination processor 440, a storage device controller 445 and/or a tamper monitor 450.

The components of the computing device 105-f may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some implementations, the storage device 410-c, the I/O interface 415-c and the receiver 420-c may be configured similarly to the storage device 410, 410-a, 410-b, the I/O interface 415, 415-a, 415-b and the receiver 420, 420-a, 420-b, respectively, as described above with reference to FIGS. 4A, 4B and/or 4C. In some implementations, the processor 405-c may be configured to perform similar operations as the processor 405, 405-a, 405-b described above with reference to FIGS. 4A, 4B and/or 4C.

The location determination processor 440 may be configured to control or otherwise cooperate with the receiver 420-*c* and the storage device 410-*c* (via the storage device controller 445) to carry out various operations of the computing device 105-*f* in connection with the location-based data security features described herein.

In this example, the location determination processor 440 may be configured to receive location information from the receiver 420-*c* (such as GPS signals and/or signals from access points 120). The location determination processor 440 may be configured to use the received information to compute or otherwise determine the current location of the computing device 105-*f*. When the location determination processor 440 receives location information from multiple sources, the location determination processor 440 may verify the current location based on the information from one source with the current location based on the information from another source. Alternatively, the location determination processor 440 may be configured to use one source of information as a primary source, and to use the other source(s) of information in case of a failure from the primary source of information (e.g., not received, corrupted, not decodable, etc.).

Alternatively or additionally, the tamper monitor 450 may be configured to determine whether a difference between the determinations of the current location is within an acceptable tolerance. If not, the tamper monitor 450 may determine that the location information may have been compromised and that the current location determined by the location determination processor 440 cannot be trusted. In such case, the tamper monitor 450 may instruct the storage device controller 445 to deny access to the data (e.g., secured data) stored on the storage device 410-*c*. The tamper monitor 450 may also instruct the location determination processor 440 to discontinue its operation (e.g., to not provide an instruction to the storage device controller 445 based on the untrusted current location).

Absent intervention by the tamper monitor 450, the location determination processor 440 may compare its determination of the current geographical location of the computing device 105-*f* with the predetermined geographical area(s) and to determine whether the current geographical location is within the predetermined geographical area(s). The storage device controller 445 may be configured to allow and/or deny access to the storage device 410-*b* (or a portion thereof) using the determination from the location determination processor 440 or based on an instruction from the location determination processor 440. In some instances, the storage device controller 445 may be part of the storage device 410-*c*.

Figure 4E:
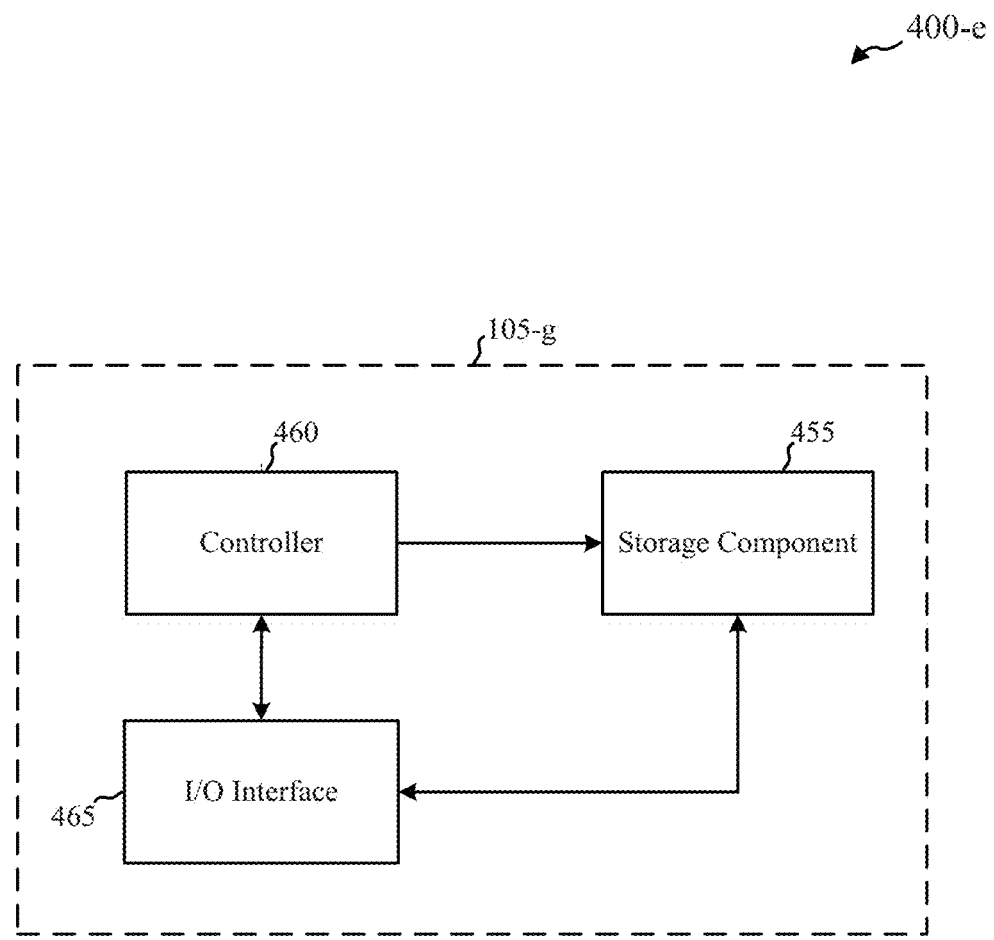
FIG. 4E is a block diagram illustrating one more example of a computing device for which data security may be provided, in accordance with various embodiments.

FIG. 4E shows a block diagram 400-*e* of a computing device 105-*g* for which data security may be provided, in accordance with various aspects of the present disclosure. In some implementations, the computing device 105-*g* may be an example of various aspects of the computing devices 105, 105-*a*, 105-*b*, 105-*c*, 105-*d*, 105-*e* and/or 105-*f* described with reference to FIGS. 1, 2, 3, 4A, 4B, 4C and/or 4D. The computing device 105-*g* may include a storage component 455, a controller 460 and an input/output (I/O) interface 465. Each of these components may be in communication with each other. The computing device 105-*g* may be an example of a portable hard drive. As such, the functionality of the computing device 105-*g* may differ from the foregoing examples in that the computing device 105-*g* may not be configured to provide operations not related to data storage and access.

The storage component 455 may be of any suitable configuration designed to store data, whether by magnetic, optical or other means. The other components of the computing device 105-*g* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In this example, the I/P interface 465 may be configured to receive a request for data stored on the storage component 455. In some instances, the I/O interface 465 may be or include a physical port. The request may be received from another computing device, for example, connected to the I/O interface 465. The I/O interface 465 also may be configured to receive location information (such as GPS signals and/or signals from access points 120). As such, the computing device 105-*g* may be referred to as a location aware disk drive, for example. Alternatively or additionally, the I/O interface 465 may be configured to receive location information from another computing device, for example, connected to the I/O interface 465. However, verification of such location information may be performed, for example, to ensure that the other computing device is collocated with the computing device 105-*g*, and not remote.

The I/O interface 465 may provide the location information to the controller 460. The controller 460 may be configured to use the received information to compute or otherwise obtain the current geographical location of the computing device 105-*g*. For example, another computing device connected to the I/O interface 465 may compute and provide the current geographical location. The computing device 105-*g* may be provisioned or otherwise provided with a predetermined geographical area(s), for example, as part of a security policy for the computing device 105-*g*. The controller 460 may use the obtained current geographical location of the computing device 105-*g* and the predetermined geographical area(s) (e.g., by comparing) to determine whether the current geographical location is within the predetermined geographical area(s). The controller 460 may be configured to allow and/or deny access (e.g., via an instruction) to a storage device 410-*b* (or a portion thereof—see FIG. 4C) using the determination.

Figure 5:
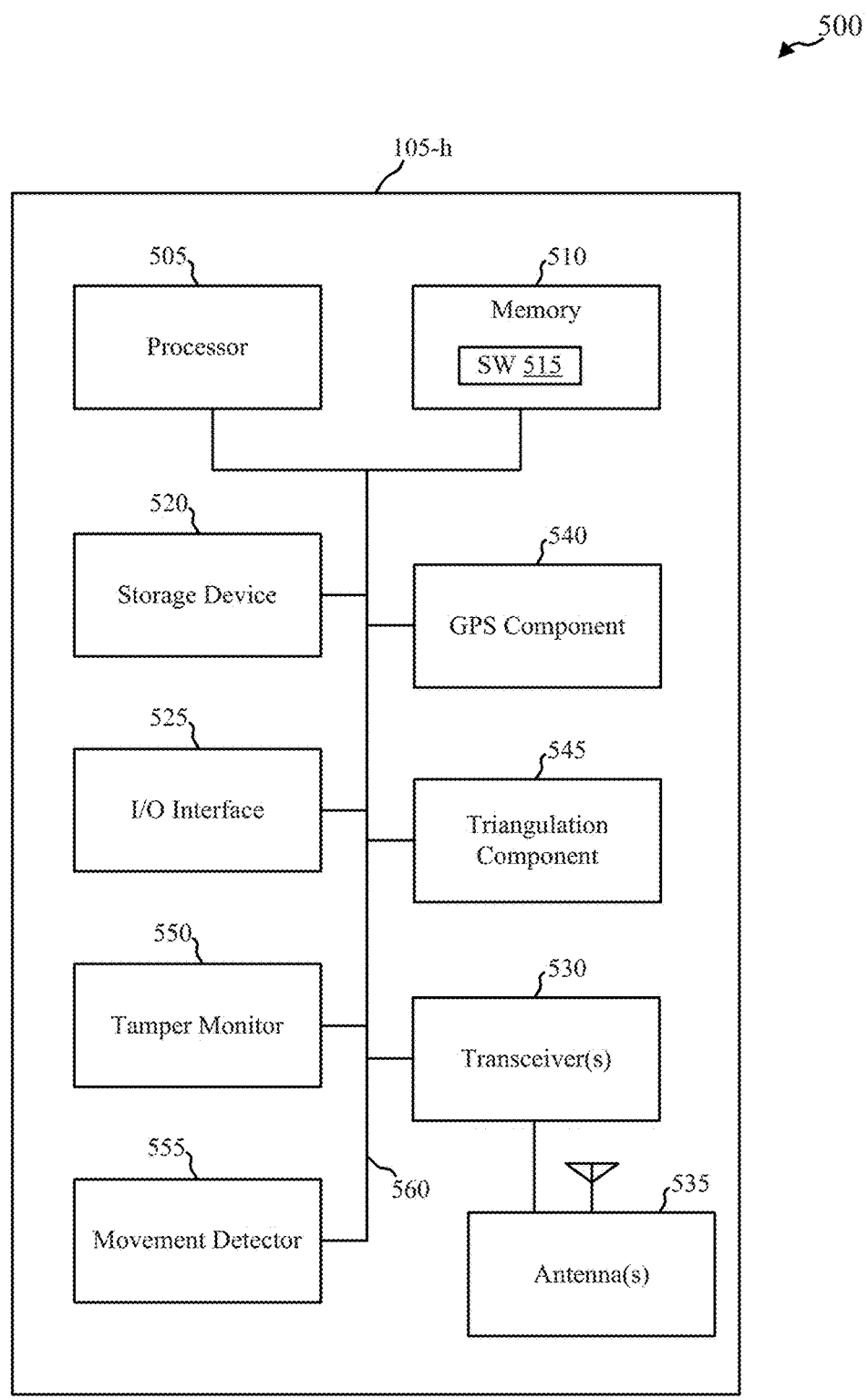
FIG. 5 is a block diagram illustrating an example of an architecture for a computing device for which data security may be provided, in accordance with various embodiments.

FIG. 5 shows a block diagram 500 of an example of an architecture for a computing device 105-*h* for which data security may be provided, in accordance with various aspects of the present disclosure. The computing device 105-*h* may have various configurations and may be included in or be part of a personal computer (e.g., a laptop computer, netbook computer, tablet computer, etc.), a cellular telephone, a PDA, a digital video recorder (DVR), an internet appliance, a gaming console, an e-reader, etc. The computing device 105-*h* may in some cases have an internal power supply (not shown), such as a small battery, to facilitate mobile operation. In some implementations, the computing device 105-*h* may be an example of various aspects of the computing devices 105, 105-*a*, 105-*b*, 105-*c*, 105-*d*, 105-*e*, 105-*f* and/or 105-*g* described with reference to FIGS. 1, 2, 3, 4A, 4B, 4C, 4D and/or 4E. The computing device 105-*h* may be configured to implement at least some of the features and functions described with reference to FIGS. 1, 2, 3, 4A, 4B, 4C, 4D and/or 4E.

The computing device 105-*h* may include a processor 505, a memory 510, a storage device 520, an I/O interface 525, at least one transceiver 530, at least one antenna 535, a GPS component 540, a triangulation component 545, a tamper monitor 550 and/or a movement detector 555. Each of these components may be in communication with each other, directly or indirectly, over a bus 560.

The memory 510 may include random access memory (RAM) and/or read-only memory (ROM). The memory 510 may store computer-readable, computer-executable software (SW) code 515 containing instructions that are configured to, when executed, cause the processor 505 to perform various functions described herein for providing data security for data stored on the storage device 520, as well as to perform any other functions for which the computing device 105-*h* may be designed. Alternatively, the software code 515 may not be directly executable by the processor 505 but be configured to cause the computing device 105-*h* (e.g., when compiled and executed) to perform various of the functions described herein.

The processor 505 may include an intelligent hardware device, e.g., a CPU, a microcontroller, an ASIC, etc. The processor 505 may process information received through the transceiver(s) 530 and/or information to be sent to the transceiver(s) 530 for transmission through the antenna(s) 535. The processor 505 may handle, alone or in cooperation with other components, various aspects of providing data security for data stored on the storage device 520.

The processor 505 may be configured to perform and/or control some or all of the features and/or functions described with reference to FIGS. 1, 2, 3, 4A, 4B, 4C, 4D and/or 4E related to data security. For example, the processor 505 may be configured to implement a location-based security scheme for controlling access to data stored on the storage device 520. The processor 505 may be configured to control or cooperate with the GPS component 540 and/or the triangulation component 545 to identify or determine a current geographical location of the computing device 105-*h*. The GPS component 540 and the triangulation component 545 may cooperate with the transceiver(s) 530, for example, to obtain location information (e.g., GPS signals or signals from access points 120). In some instances, the tamper monitor 550 may be configured to cooperate with the GPS component 540 and/or the triangulation component 545 to verify the location information or otherwise determine whether the location information and/or current geographical location of the computing device 105-*h* determined therefrom should be trusted.

The predetermined geographical area for the computing device 105-*h* may be retained in the memory 510. The tamper monitor 550, alternatively or additionally, may be configured to ensure that the predetermined geographical area in the memory 510 is not altered without authorization (e.g., without administrator access). The processor 505 may obtain the predetermined geographical area from the memory 510 and the current geographical location from the GPS component 540 and/or the triangulation component 545 to determine whether the current geographical location of the computing device 105-*h* is within the predetermined geographical area. Based at least in part on the determination, the processor may deny access to the storage device 520 or otherwise instruct the storage device 520 to deny access.

The movement detector 555 may be implemented with one or more accelerometers, or with any other suitable components capable of detecting movement of the computing device 105-*h*. Upon detecting movement, the movement detector 555 may instruct or otherwise provide a signal (e.g., via the processor 505) to the GPS component 540 and/or the triangulation component 545 to determine an updated geographical location of the computing device 105-*h*. As described above, the processor 505 may instruct the GPS component 540 and/or the triangulation component 545 to determine an updated geographical location of the computing device 105-*h* periodically, even absent detected movement of the computing device 105-*h*.

Figure 6:
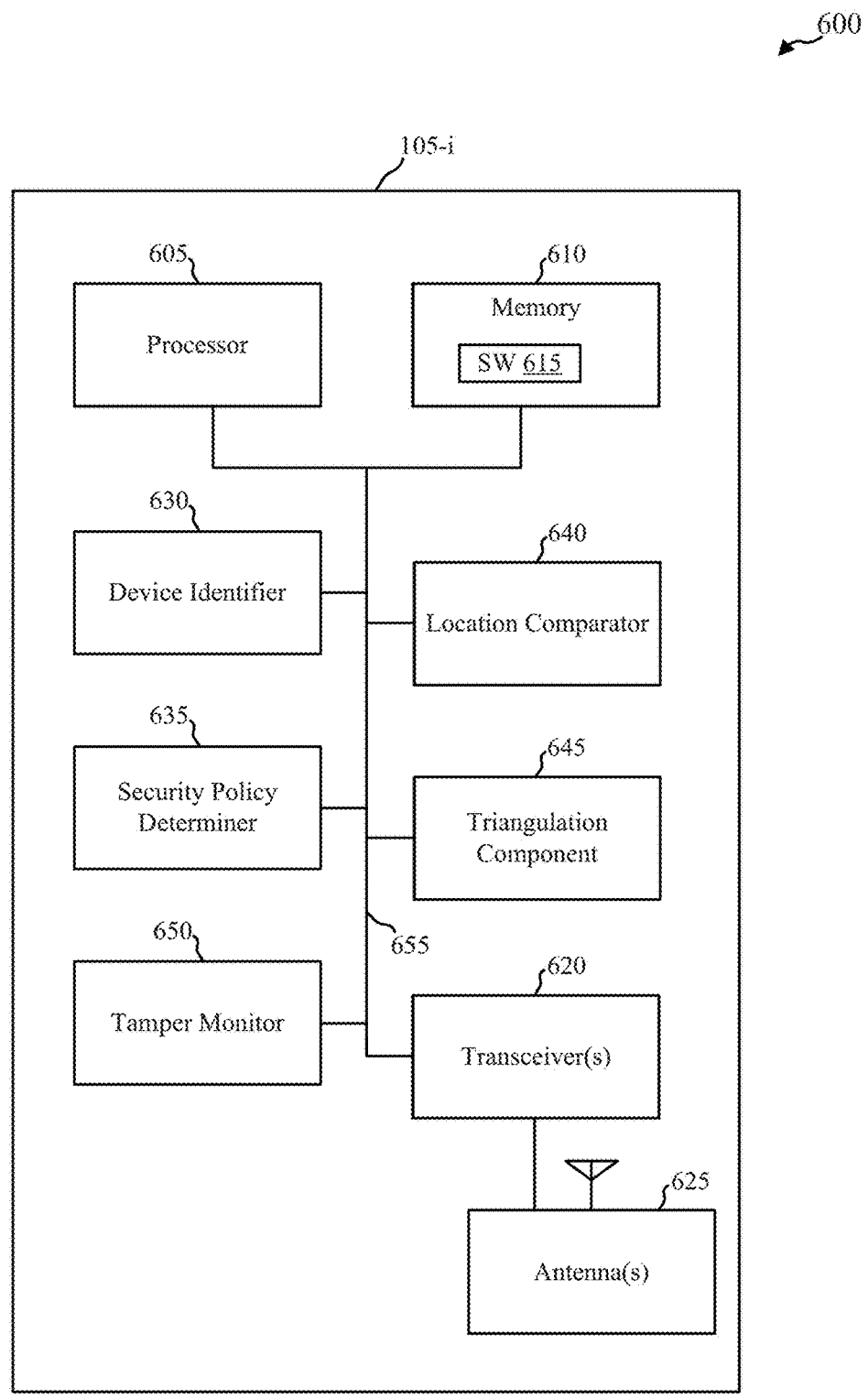
FIG. 6 is a block diagram illustrating an example of an architecture for a computing device that may provide data security, in accordance with various embodiments.

FIG. 6 shows a block diagram 600 of an example of an architecture for a computing device 105-*i* that may provide data security for another computing device (not shown), such as the computing device 105-*h* described with respect to FIG. 5. The computing device 105-*i* may have various configurations and may be included in or be part of a computer (e.g., a server). In some implementations, the computing device 105-*h* may be an example of various aspects of the location based security service provider 320 described with reference to FIG. 3. The computing device 105-*i* may be configured to implement at least some of the features and functions described with reference to FIGS. 2 and/or 3.

The computing device 105-*i* may include a processor 605, a memory 610, at least one transceiver 620, at least one antenna 625, a device identifier 630, a security policy determiner 635, a location comparator 640, a triangulation component 645 and/or a tamper monitor 650. Each of these components may be in communication with each other, directly or indirectly, over a bus 655.

The memory 610 may include random access memory (RAM) and/or read-only memory (ROM). The memory 610 may store computer-readable, computer-executable software (SW) code 615 containing instructions that are configured to, when executed, cause the processor 505 to perform various functions described herein for providing data security for data stored on a storage device of another computing device. Alternatively, the software code 615 may not be directly executable by the processor 605 but be configured to cause the computing device 105-*i* (e.g., when compiled and executed) to perform various of the functions described herein.

The processor 605 may include an intelligent hardware device, e.g., a CPU, a microcontroller, an ASIC, etc. The processor 605 may process information received through the transceiver(s) 620 and/or information to be sent to the transceiver(s) 620 for transmission through the antenna(s) 625. The processor 605 may handle, alone or in cooperation with other components, various aspects of providing data security for data stored on a storage device of another computing device.

The processor 605 may be configured to perform and/or control some or all of the features and/or functions described with reference to FIGS. 2 and/or 3 related to data security. For example, the processor 605 may be configured to implement a location-based security scheme for controlling access to data stored on a storage device of another computing device. The processor 605 may be configured to control or cooperate with the device identifier 630 to determine an identity of the other computing device for which data security is being provided. The device identifier 630 may be configured to determine the identity of the other computing device in any suitable manner, such as by Internet Protocol (IP) address, for example. The security policy determiner 635 may determine a security policy associated with the identity of the other computing device. The security policy may include a predetermined or prescribed geographical area within which access to the data on the storage device of the other computing device should be allowed. The tamper monitor 650 may be configured to detect or otherwise identify an unauthorized modification of the security policy, for example, by somebody without administrator access.

The computing device 105-*i* may be configured to receive a current geographical location of the other computing device, for example, via the antenna(s) 625 and transceiver(s) 620. The triangulation component 645 may be configured to obtain triangulation information for locating the other computing device, and may use the obtained triangulation information to verify the received current geographical location of the other computing device. Once verified, the location comparator may determine whether the received current geographical location of the other computing device is within the predetermined/prescribed geographical area. If not, the computing device 105-*i* may deny access to the data stored on the other computing device, for example, by sending a signal or instruction to the other computing device to cause the other computing device or the storage device thereof to deny access.

In some implementations, the computing device 105-*i* may be configured to detect movement of the other computing device. For example, the computing device 105-*i* may be configured to receive information regarding movement of the other computing device, and the processor 605 may be configured to cause the other components to determine whether an updated current geographical location of the other computing device is within the predetermined/prescribed geographical area. Alternatively, the computing device 105-*i* may be configured to receive the updated current geographical location automatically upon movement of the other computing device (which may be recognized as movement of the other computing device when not part of a scheduled periodic update).

Figure 7:
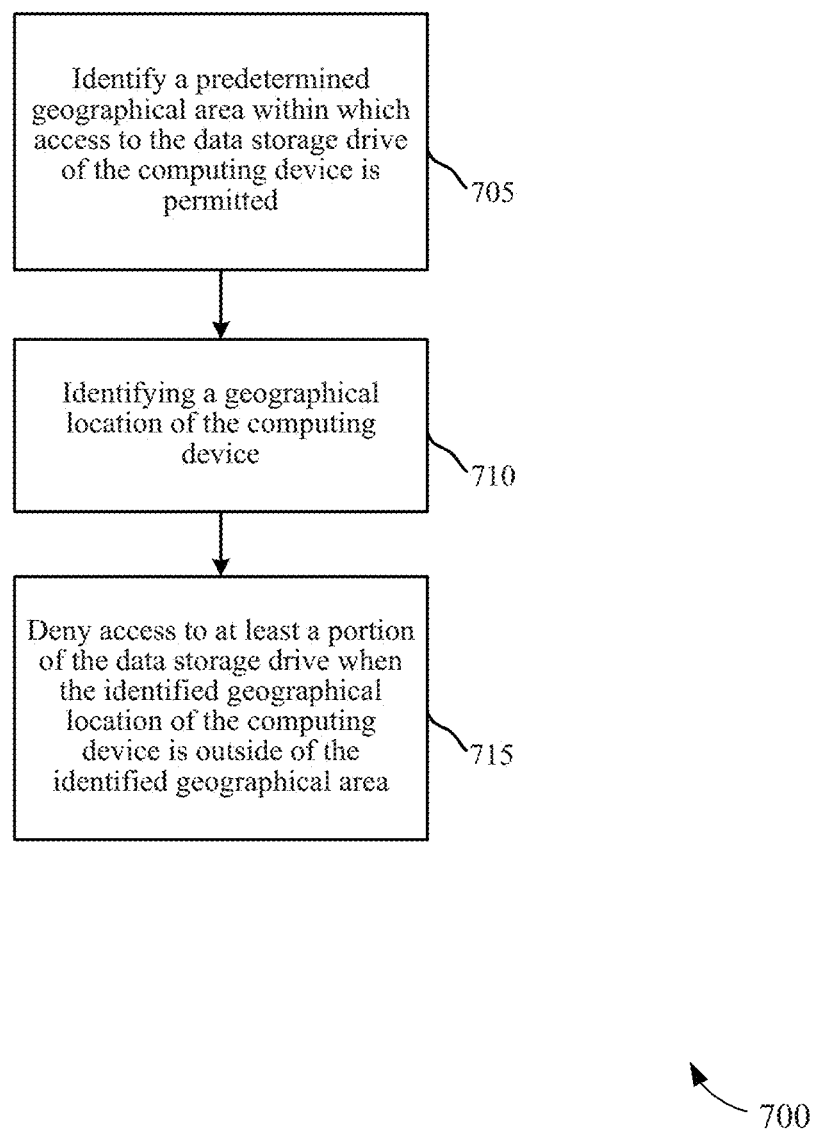
FIG. 7 is a flowchart illustrating an example of a method of providing data security for a computing device, in accordance with various embodiments.

FIG. 7 is a flowchart illustrating an example of a method 700 of providing data security for a computing device, in accordance with various aspects of the present disclosure. For clarity, the method 700 is described below with reference to aspects of the computing devices 105 described with reference to FIG. 1, and/or the computing devices 105-*a*, 105-*b*, 105-*c*, 105-*d*, 105-*e*, 105-*f*, 105-*g*, 105-*h* and/or 105-*i* described with reference to FIGS. 2, 3, 4A, 4B, 4C, 4D, 4E, 5 and/or 6. In some implementations, such a computing device may execute one or more sets of codes to control the functional elements of the computing device to perform the functions described below.

In this example, the computing device for which data security is provided includes a data storage drive. At block 705, a predetermined geographical area within which access to the data storage drive of the computing device is permitted may be identified. As described herein, the predetermined geographical area may be included as part of a security policy for the computing device, and may be defined by a plurality of distinct geographical areas, which may be discontinuous, adjacent and/or overlapping.

At block 710, a geographical location of the computing device data may be identified. As described herein, the geographical location may be based on any suitable location determination technique, such as GPS.

At block 715, when the identified geographical location of the computing device is outside of the identified geographical area, access to at least a portion of the data storage drive may be denied.

Figure 8:
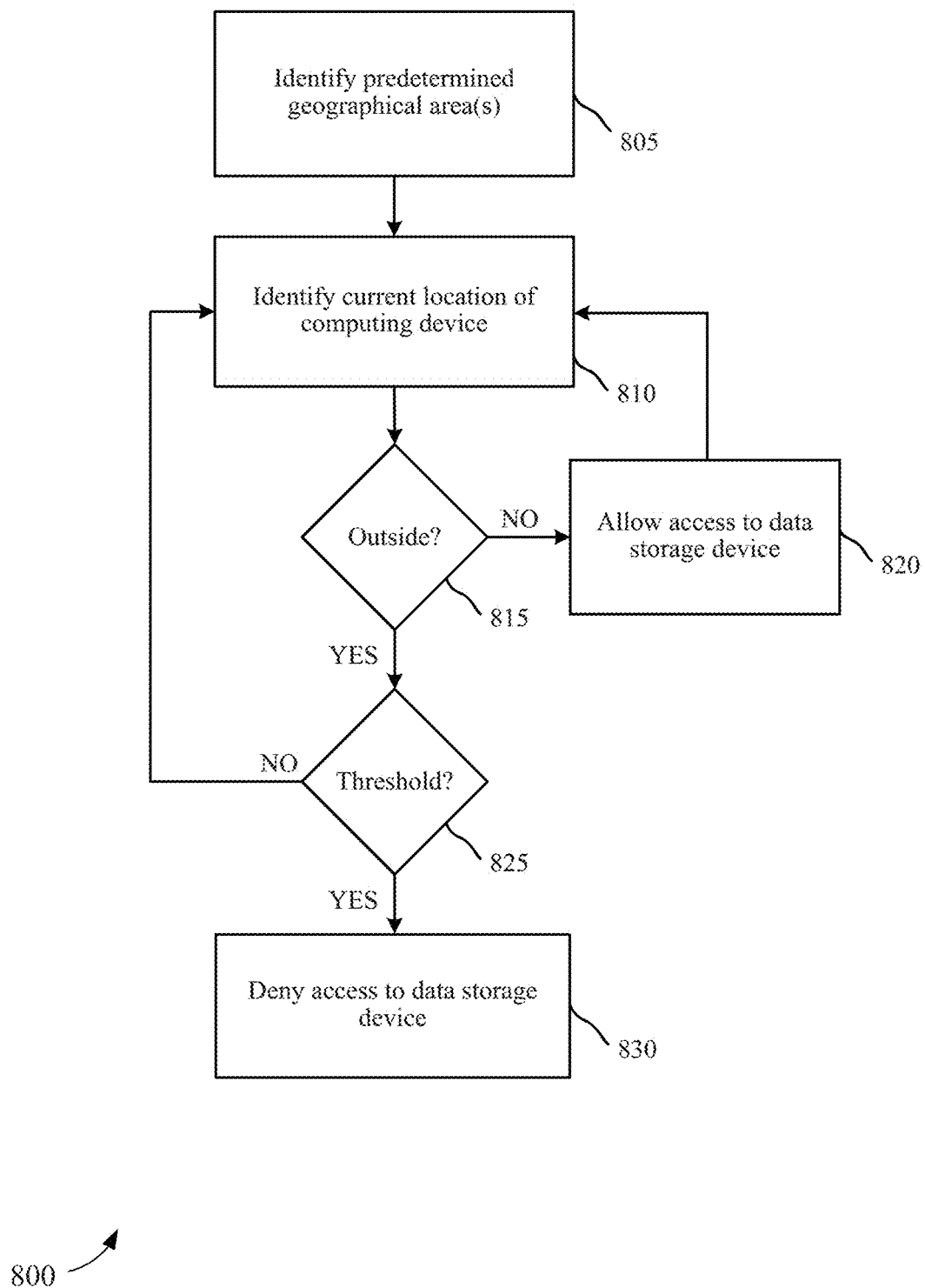
FIG. 8 is a flowchart illustrating another example of a method of providing data security for a computing device, in accordance with various embodiments.

FIG. 8 is a flowchart illustrating another example of a method 800 of providing data security for a computing device, in accordance with various aspects of the present disclosure. For clarity, the method 800 is described below with reference to aspects of the computing devices 105 described with reference to FIG. 1, and/or the computing devices 105-*a*, 105-*b*, 105-*c*, 105-*d*, 105-*e*, 105-*f*, 105-*g*, 105-*h* and/or 105-*i* described with reference to FIGS. 2, 3, 4A, 4B, 4C, 4D, 4E, 5 and/or 6. In some implementations, such a computing device may execute one or more sets of codes to control the functional elements of the computing device to perform the functions described below.

In this example, the computing device for which data security is provided includes a data storage drive. At block 805, a predetermined geographical area(s) within which access to the data storage drive of the computing device is permitted may be identified. Next, at block 810, a current geographical location of the computing device data may be identified.

At block 815, a determination is made whether the current geographical location of the computing device is outside of the identified geographical area(s). If not, the method continues to block 820, where access to the data storage drive may be allowed. The method may then return to block 810 to continue to monitor the location of the computing device. Alternatively, the method may return to block 805 to capture the possibility that the predetermined geographical area(s) have been changed for the computing device. In some implementations, returning to block 805 may be periodical, for example.

If the determination at block 815 is that the current geographical location of the computing device is outside of the identified geographical area(s), the method may jump to block 825, where a determination is made whether a threshold has been met or exceeded. The threshold may be a certain number of times for which the computing device is determined to be located outside the predetermined geographical area(s). For example, if the threshold number is one, block 825 may be omitted and the method may continue to block 830, where access to the data storage drive may be denied.

If the threshold number is greater than one, the method may return to block 810. Assuming that the current geographical location of the computing device is still outside of the identified geographical area(s), the method may make its way back to block 825. If the threshold number has been reached at this point, the method may continue to block 830, where access to the data storage drive may be denied. Otherwise, the method again may return to block 810, and so on. Of course, if the current geographical location of the computing device falls within the identified geographical area(s) at any point before the threshold number is reached, the method will continue to block 820 instead of block 825 and the number of times for which the computing device is determined to be located outside the predetermined geographical area(s) may be reset.

Alternatively or additionally, the threshold may be a certain amount of time for which the computing device is determined to be located outside the predetermined geographical area(s). In such case, the flow of the method 800 may be reconfigured to start a timer upon a first determination that the current geographical location of the computing device is outside or to time stamp the first determination.

Further, the flow may be reconfigured to have a second determination that the current geographical location of the computing device is outside occur before the method moves from block 815 to block 825. At that point, a value of the timer (or a difference between time stamps) may be compared to the threshold amount of time at block 825. If so, the method may continue to block 830 where access to the data storage drive may be denied. Otherwise, the method again may return to block 810 (or block 805), and so on.

Figure 9:
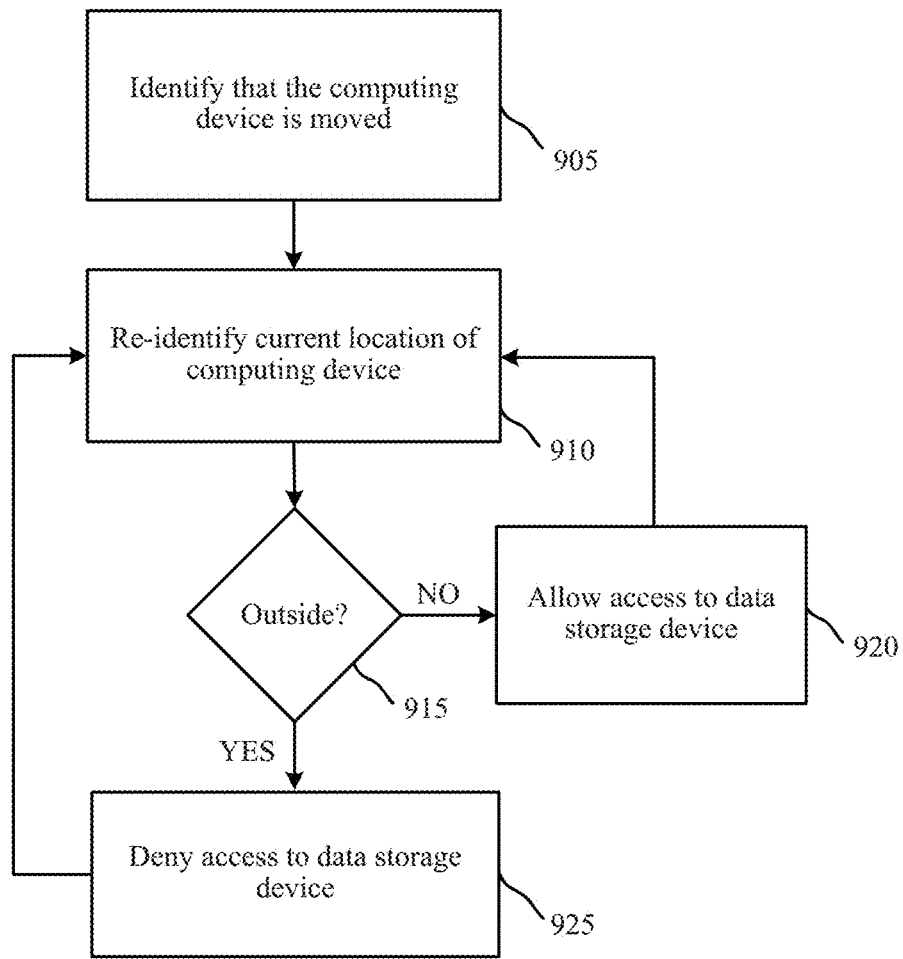
FIG. 9 is a flowchart illustrating yet another example of a method of providing data security for a computing device, in accordance with various embodiments.

FIG. 9 is a flowchart illustrating yet another example of a method 900 of providing data security for a computing device, in accordance with various aspects of the present disclosure. For clarity, the method 900 is described below with reference to aspects of the computing devices 105 described with reference to FIG. 1, and/or the computing devices 105-*a*, 105-*b*, 105-*c*, 105-*d*, 105-*e*, 105-*f*, 105-*g*, 105-*h* and/or 105-*i* described with reference to FIGS. 2, 3, 4A, 4B, 4C, 4D, 4E, 5 and/or 6. In some implementations, such a computing device may execute one or more sets of codes to control the functional elements of the computing device to perform the functions described below.

In this example, the computing device for which data security is provided includes a data storage drive. Further, the computing device may have previously been determined to be outside or within the predetermined geographical area(s), for example, as described with respect to FIGS. 7 and/or 8.

At block 905, a determination that the computing device has been moved may be made. Next, at block 910, a current geographical location of the computing device data may be re-identified. At block 915, a determination is made whether the current geographical location of the computing device is outside of the identified geographical area(s). If not, the method continues to block 920, where access to the data storage drive may be allowed. The method may then return to block 905 to continue to monitor whether the computing device is moved.

If the determination at block 915 is that the current geographical location of the computing device is outside of the identified geographical area(s), the method may jump to block 925, where access to the data storage drive may be denied. The method may then return to block 905 to continue to monitor whether the computing device is moved.

Thus, the method 900 provides a manner in which to update the current geographical location of the computing device when it is moved, rather than waiting for a periodic update of the current geographical location of the computing device, for example.

As discussed above, denying access may involve denying access (in whole or in part) to the data storage drive), to the data stored on the data storage drive and/or to the storage component of the data storage drive (e.g., in the case of a portable disk drive). Further, in some implementations, denying access may involve instructing or signaling a device or component to deny access (e.g., in the case of data stored on the data storage drive of a computing device different from the computing device performing the instructing/signaling).

In some implementations, denying access may involve shutting down (in whole or in part) the data storage drive. In some cases, shutting down the data storage drive may involve shutting down an operative component of the data storage drive (e.g., a component needed for data retrieval), or discontinuing power to the operative component and/or the data storage drive.

In some implementations, denying access may involve disabling (in whole or in part) the data storage drive. In some cases, disabling the data storage drive may involve disabling an operative component of the data storage drive, or altering functionality of the operative component such that the operative component no longer is capable of accessing part of the data storage drive.

In some implementations, denying access may be temporary and discontinued or reversed when the current geographical location of the computing device becomes located within the predetermined geographical area.

In other implementations, denying access may be permanent. For example, denying access may involve erasing data from the data storage drive (in whole or in part). In other cases, denying access may involve corrupting data from the data storage drive (in whole or in part). In still other cases, denying access may involve destroying the data storage drive (in whole or in part), or destroying an operative component of the data storage drive. Such operations may be implemented in combination and/or in sequence.

Whether to employ a permanent denial of access may be determined based on various factors. For example, an amount of time the computing device is located outside of the predetermined geographical area and/or a distance the computing device is located from the predetermined geographical area may be considered. Additionally or alternatively, the attributes of the data being protected (e.g., sensitivity, confidentiality, importance, storage elsewhere, etc.) may be considered.

In some instances, data may have already been accessed from the data storage drive when the current geographical location of the computing device is determined to be outside of the predetermined geographical area. In such case, additional measures may be employed to remove the previously accessed data. For example, the previously accessed data may be stored in memory of the computing device such that erasing or temporarily clearing (or even shutting down) the memory may be sufficient. If an application that is using the previously accessed data prevents such an approach, for example, by preventing the data in use from being erased from the memory, the application itself may be shut down and/or restarted to release the data.

In some instances, data access from the data storage drive may be in progress when the current geographical location of the computing device is determined to be outside of the predetermined geographical area. In such case, an additional measure of discontinuing the data access in progress may be employed. Further, any data already accessed may be dealt with as discussed above.

A robust solution for location based data security as described herein may be desired. As discussed above, location based data security may be employed in combination with other security measures, such as user authentication and/or encrypting all data (or at least the secured data) stored on the data storage drive. Further, various approaches for determining location and/or movement of the computing device may be considered.

One approach is to employ a geo-fencing application, which may run as a background task on the computing device for relatively long periods of time. The geo-fencing application may calculate the geographic location (e.g., location coordinates) of the computing device and report the location/coordinates on a periodic basis, for example. Because operations of the geo-fencing application will consume power of the computing device (e.g., battery power), an efficient (e.g., low power consumption) implementation maybe desirable.

Another approach is to employ a GPS receiver, which may be quite cost effective and may provide location accuracy within about fifteen (15) meters. Advanced GPS receivers may employ a WAAS (Wide Area Augmentation System) signals to achieve location accuracy within about three (3) meters. However, GPS receivers may suffer from loss of GPS satellite signals, for example, underground or within a substantial structure or building. Adversarial scrambling may also pose an issue for GPS receivers. Thus, as discussed herein, more than one approach may be employed for determining location to provide a certain level of redundancy.

In general, location based data security may benefit from a sufficiently fail-safe geographical location determining system. Alternatively or additionally, the geographical location determining system may be backed-up, for example, with intelligent heuristics that are capable of making discriminating decisions regarding the location of the computing device relative to the predetermined geographical area.

It is contemplated that location based data security as described herein may benefit from, and thus employ, advanced navigation and positioning solutions that are still being developed. For example, DARPA (the Defense Advanced Research Projects Agency) is investigating inertial measurement units (IMUs) technology. Such technology may employ multiple gyroscopes and accelerometers (e.g., three of each) to gauge direction changes in velocity. In some contexts, this technology may be used in addition to or in place of GPS, depending on cost, reliability, etc. of this technology compared to GPS.

The location based data security described herein may employ various tamper resistance measures (e.g., in addition to tamper detection) to protect the integrity of the location/position determining component(s), such as GPS. A GPS component of the computing device may be provided with hardware tamper resistance and firmware tamper detection, for example, by leveraging tamper resistance techniques employed by the U.S. government (e.g., Federal Information Processing Standards (FIPS) publication 140-1). Hardware tamper resistance/detection may involve providing robust metal enclosures and/or tamper-sensing mesh, for example, to protect against physical tampering. In some implementations, a response to detected tampering may involve some level of inoperability of the data storage drive. For example, the response level of inoperability may range from disengaging the data storage drive (or the drive thereof) to erasing all secured (e.g., secret) data from the data storage drive and deactivation security credentials of authorized users, to invoking a self-destruct operation for the data storage drive.

The location based data security described herein may employ Role Based Access Control (RBAC) to establish a hierarchy of access permissions based on predefined roles. Individuals with suitable roles (e.g., system administrators) may have authority to access, for example, a security policy for the computing device that identifies a predetermined geographical area within which access to the data storage drive of the computing device is permitted. Thus, such individuals may be authorized to setup and modify the security policy. However, an end user of the computing device has a different role and may be prohibited from accessing (and thereby manipulating or modifying) the security policy.

If the location based security employs a service provider, authorized individuals associated with the service provider may have access to a plurality of security policies for multiple computing devices. This approach may further limit access of the end users of the computing devices from inappropriate access to the security policies.

RBAC levels may be employed for initial setup of location based access security for a computing device. For example, an administrator may power up the computing device and connect to the data storage drive (e.g., a controller of the data storage drive) of the computing device by negotiating a login sequence that verifies the credentials (e.g., RBAC level) of the administrator to allow access. The administrator then may enable a location based security feature of the data storage drive, for example, by setting a suitable bit in the controller.

The administrator may establish a predetermined area or areas, for example, by entering boundary coordinates for the area(s) in which read/write access to the data storage drive will be permitted. The administrator also may establish an interval for checking the current location of the computing device as part of a security policy. Other features of the security policy may include, for example, threshold setting (e.g., number of unsuccessful location identification attempts, period of time elapsed from last successful location attempt, amount of movement permitted, etc.), degradation level setting (e.g., temporary disable/shut down, permanent disable/shut down, erase, destruction, etc.), and establishing parameters for warning the end user regarding pending denial of access. If a service provider is to be used for monitoring location of the computing device and enforcing the security policy, the administrator may also setup or establish configuration parameters for the computing device to cooperate with the service provider.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of providing data security for a storage drive, comprising:

identifying a predetermined geographical area within which access to the storage drive is permitted;

determining a geographical location of the storage drive;

permitting access to at least a portion of the storage drive when the determined geographical location of the storage drive is within the identified geographical area;

upon determining the determined geographical location of the storage drive is outside the identified geographical area, determining a time period over which the storage drive remains outside the identified geographical area;

upon determining the time period satisfies a time threshold, denying access to at least a portion of the storage drive;

determining a failure of identifying the geographical location of the storage drive, or that the geographical location of the storage drive is indeterminable, or determining both; and denying access to at least the portion of the storage drive based at least in part on the determining.

2. The method of claim 1, further comprising:

identifying an alteration with respect to at least one of identifying the predetermined geographical area or identifying the geographical location; and denying access to at least the portion of the storage drive based at least in part on the identifying of the alteration.

3. The method of claim 1, further comprising:

removing data in a memory device accessed from the storage drive when the determined geographical location of the storage drive is outside of the identified geographical area.

4. The method of claim 1, further comprising:

identifying when the storage drive is moved; and re-identifying the geographical location of the storage drive when the storage drive is identified as moved.

5. The method of claim 1, further comprising:

determining an amount of movement of the storage drive; and denying access to at least a portion of the storage drive when the determined amount of movement exceeds a movement threshold.

6. The method of claim 5, further comprising:

setting the movement threshold based at least in part on the identified geographical area.

7. The method of claim 1, further comprising:

upon determining the geographical location of the storage drive is not able to be identified, determining an amount of movement of the storage drive; and denying access to at least a portion of the storage drive when the determined amount of movement exceeds a movement threshold.

8. The method of claim 1, wherein denying access is performed by shutting down the storage drive, or by disabling at least part of the storage drive, or by destroying at least part of the storage drive, or by encrypting data stored on at least the portion of the storage drive, or any combination thereof.

9. The method of claim 1, wherein the predetermined geographical area is at least one of discontinuous or comprises a plurality of distinct geographical areas.

10. A computing device, comprising:

a storage drive;

one or more processors;

memory in electronic communication with the one or more processors, wherein the memory stores computer executable instructions that when executed by the one or more processors cause the one or more processors to perform the steps of:

identifying a predetermined geographical area within which access to the storage drive is permitted;

determining a geographical location of the storage drive;

permitting access to at least a portion of the storage drive when the determined geographical location of the storage drive is within the identified geographical area;

upon determining the determined geographical location of the storage drive is outside the identified geographical area, determining a time period over which the storage drive remains outside the identified geographical area;

upon determining the time period satisfies a time threshold, denying access to at least a portion of the storage drive;

determining a failure of identifying the geographical location of the storage drive, or that the geographical location of the storage drive is indeterminable, or determining both; and denying access to at least the portion of the storage drive based at least in part on the determining.

11. The computing device of claim 10, the one or more processors to perform the steps of:

identifying an alteration with respect to at least one of identifying the predetermined geographical area or identifying the geographical location; and denying access to at least the portion of the storage drive based at least in part on the identifying of the alteration.

12. The computing device of claim 10, the one or more processors to perform the steps of:

removing data in a memory device accessed from the storage drive when the determined geographical location of the storage drive is outside of the identified geographical area.

13. The computing device of claim 10, the one or more processors to perform the steps of:

identifying when the storage drive is moved; and re-identifying the geographical location of the storage drive when the storage drive is identified as moved.

14. The computing device of claim 10, the one or more processors to perform the steps of:

determining an amount of movement of the storage drive; and denying access to at least a portion of the storage drive when the determined amount of movement exceeds a movement threshold.

15. The computing device of claim 14, the one or more processors to perform the steps of:

setting the movement threshold based at least in part on the identified geographical area.

16. The computing device of claim 10, the one or more processors to perform the steps of:

upon determining the geographical location of the storage drive is not able to be identified, determining an amount of movement of the storage drive; and denying access to at least a portion of the storage drive when the determined amount of movement exceeds a movement threshold.

17. A computer-program product comprising a non-transitory computer-readable medium storing instructions thereon, the instructions being executable by one or more processors to perform the steps of:

identifying a predetermined geographical area within which access to the storage drive is permitted, wherein the predetermined geographical area includes one or more distinct geographical areas;

determining a geographical location of the storage drive;

permitting access to at least a portion of the storage drive when the determined geographical location of the storage drive is within the identified geographical area;

upon determining the determined geographical location of the storage drive is outside the identified geographical area, determining a time period over which the storage drive remains outside the identified geographical area;

upon determining the time period satisfies a time threshold, denying access to at least a portion of the storage drive;

determining a failure of identifying the geographical location of the storage drive, or that the geographical location of the storage drive is indeterminable, or determining both; and denying access to at least the portion of the storage drive based at least in part on the determining.

18. The computer-program product of claim 17, wherein the instructions executed by the one or more processors cause the one or more processors to perform the steps of:

identifying an alteration with respect to at least one of identifying the predetermined geographical area or identifying the geographical location; and denying access to at least the portion of the storage drive based at least in part on the identifying of the alteration.

* * * * *